US012664208B2

(12) United States Patent
Sharifi et al.

(10) Patent No.: US 12,664,208 B2
(45) Date of Patent: *Jun. 23, 2026

(54) METHODS AND SYSTEMS FOR PROVIDING A SECURE AUTOMATED ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/050,781

(22) Filed: Feb. 11, 2025

(65) Prior Publication Data

US 2025/0181628 A1     Jun. 5, 2025

Related U.S. Application Data

(63) Continuation of application No. 18/538,773, filed on Dec. 13, 2023, now Pat. No. 12,254,038, which is a
(Continued)

(51) Int. Cl.
*G06F 16/00* (2019.01)
*G06F 3/16* (2006.01)
(Continued)

(52) U.S. Cl.
CPC ............ *G06F 16/433* (2019.01); *G06F 3/167* (2013.01); *G06F 40/30* (2020.01); *G10L 15/22* (2013.01); *G10L 2015/223* (2013.01)

(58) Field of Classification Search
None
See application file for complete search history.

(56) References Cited

U.S. PATENT DOCUMENTS 11,176,928 B2    11/2021    Schairer et al.
11,200,027 B2    12/2021    Aggarwal et al.
(Continued)

FOREIGN PATENT DOCUMENTS

CN        103226949        2/2017
CN        109463004        3/2019
(Continued)

OTHER PUBLICATIONS

European Patent Office, Intention to Grant issued in Application No. 21839788.3; 72 pages; dated Jun. 16, 2025.
(Continued)

*Primary Examiner* — Tuankhanh D Phan
(74) *Attorney, Agent, or Firm* — Gray Ice Higdon

(57) ABSTRACT

Implementations described herein relate to receiving user input directed to an automated assistant, processing the user input to determine whether data from a server and/or third-party application is needed to perform certain fulfillment of an assistant command included in the user input, and generating a prompt that requests a user consent to transmitting of a request to the server and/or the third-party application to obtain the data needed to perform the certain fulfillment. In implementations where the user consents, the data can be obtained and utilized to perform the certain fulfillment. In implementations where the user does not consent, client data can be generated locally at a client device and utilized to perform alternate fulfillment of the assistant command. In various implementations, the request transmitted to the server and/or third-party application can be modified based on ambient noise captured when the user input is received.

20 Claims, 11 Drawing Sheets

Related U.S. Application Data continuation of application No. 17/200,238, filed on Mar. 12, 2021, now Pat. No. 11,886,482.

(51) Int. Cl.
| | |
|---|---|
| *G06F 16/432* | (2019.01) |
| *G06F 40/30* | (2020.01) |
| *G10L 15/22* | (2006.01) |

(56) References Cited

U.S. PATENT DOCUMENTS

| | | | |
|---|---|---|---|
| 11,252,149 B1* | 2/2022 | Bang | G06F 3/167 |
| 11,886,482 B2 | 1/2024 | Sharifi et al. | |
| 2017/0178626 A1 | 6/2017 | Gruber et al. | |
| 2019/0122001 A1 | 4/2019 | Bradley et al. | |
| 2020/0327200 A1 | 10/2020 | Lozon | |
| 2020/0357395 A1* | 11/2020 | Mirelmann | G10L 15/083 |
| 2020/0387629 A1* | 12/2020 | Yang | G10L 15/1822 |
| 2022/0292128 A1 | 9/2022 | Sharifi et al. | |

| | | |
|---|---|---|
| 2024/0119083 A1 | 4/2024 | Sharifi et al. |

FOREIGN PATENT DOCUMENTS

| | | |
|---|---|---|
| CN | 110622126 | 12/2019 |
| WO | 2018231247 | 12/2018 |
| WO | 2020242595 | 12/2020 |

OTHER PUBLICATIONS

European Patent Office; Communication pursuant to Article 94(3) EPC; 6 pages; dated Jun. 26, 2024.

European Patent Office; International Search Report and Written Opinion issued in Application No. PCT/US2021/062907; 11 pages; dated Mar. 30, 2022.

Chinesse Patent Office, First Office Action issued in Aplication No. 202180088109.3, 20 pages, dated Nov. 15, 2025.

European Patent Office; Communication issued in Application No. 26159675.3, 9 pages, dated Apr. 10, 2026.

\* cited by examiner

CLIENT DEVICE
110

PRESENCE SENSOR(S) 111

USER INTERFACE COMPONENT(S) 112

120

AUTOMATED ASSISTANT CLIENT 113

SPEECH CAPTURE/ASR/NLP/TTS 114

CATEGORY ENGINE 130

FULFILLMENT ENGINE 140

RULE ENGINE 150

PRE-CACHE ENGINE 160

AMBIENT SENSING ENGINE 170

ML MODEL(S)
113A

RULE(S)
150A

199₁

**CLOUD-BASED AUTOMATED ASSISTANT
COMPONENT(S)
115**

ASR
116

NLP
117

TTS
118

199₂

199₃

FIRST-PARTY SERVER(S)
191

THIRD-PARTY SERVER(S)
192

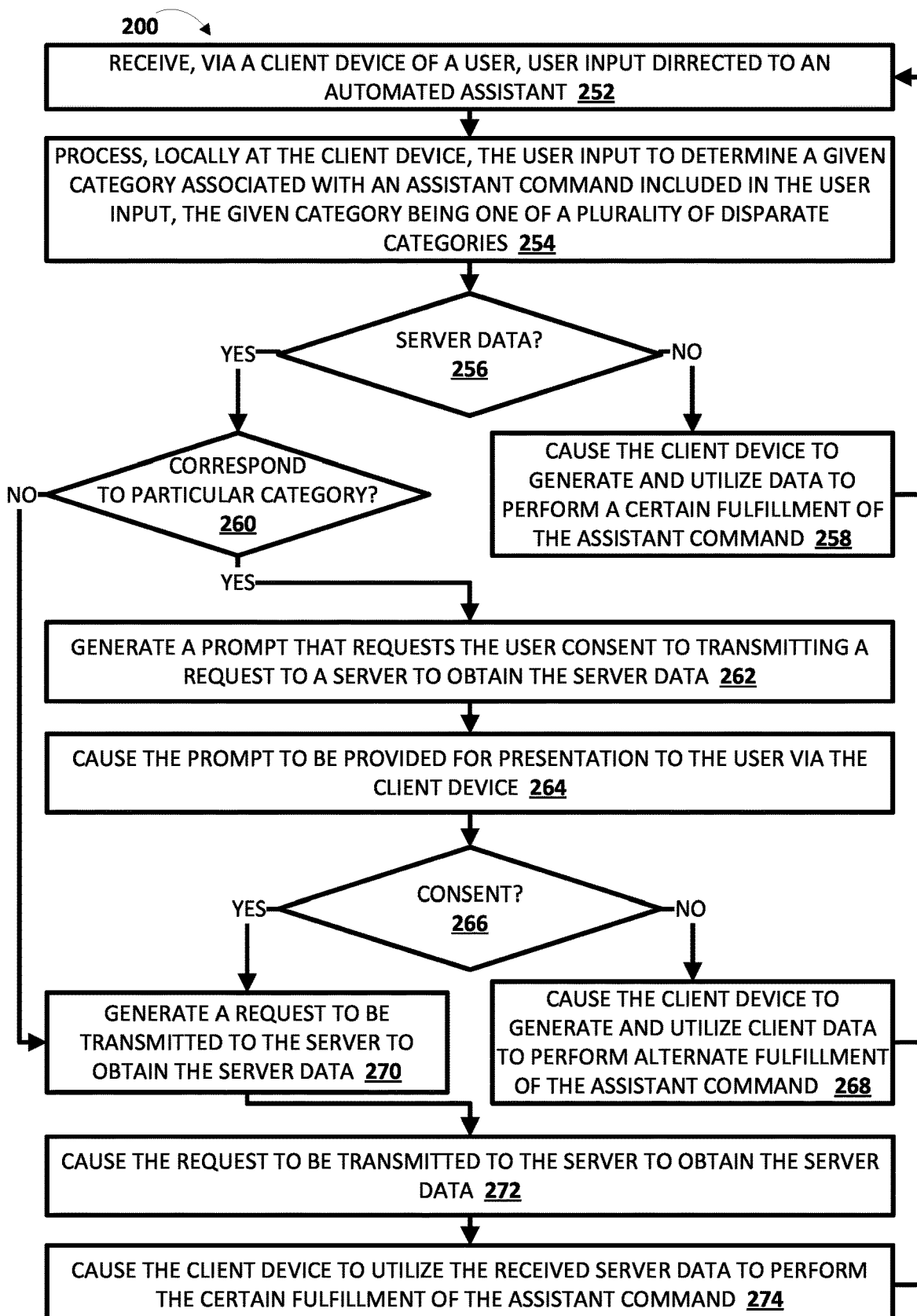

200

RECEIVE, VIA A CLIENT DEVICE OF A USER, USER INPUT DIRRECTED TO AN AUTOMATED ASSISTANT 252

PROCESS, LOCALLY AT THE CLIENT DEVICE, THE USER INPUT TO DETERMINE A GIVEN CATEGORY ASSOCIATED WITH AN ASSISTANT COMMAND INCLUDED IN THE USER INPUT, THE GIVEN CATEGORY BEING ONE OF A PLURALITY OF DISPARATE CATEGORIES 254

SERVER DATA? 256

YES            NO

CORRESPOND TO PARTICULAR CATEGORY? 260

NO

CAUSE THE CLIENT DEVICE TO GENERATE AND UTILIZE DATA TO PERFORM A CERTAIN FULFILLMENT OF THE ASSISTANT COMMAND 258

YES

GENERATE A PROMPT THAT REQUESTS THE USER CONSENT TO TRANSMITTING A REQUEST TO A SERVER TO OBTAIN THE SERVER DATA 262

CAUSE THE PROMPT TO BE PROVIDED FOR PRESENTATION TO THE USER VIA THE CLIENT DEVICE 264

CONSENT? 266

YES            NO

GENERATE A REQUEST TO BE TRANSMITTED TO THE SERVER TO OBTAIN THE SERVER DATA 270

CAUSE THE CLIENT DEVICE TO GENERATE AND UTILIZE CLIENT DATA TO PERFORM ALTERNATE FULFILLMENT OF THE ASSISTANT COMMAND 268

CAUSE THE REQUEST TO BE TRANSMITTED TO THE SERVER TO OBTAIN THE SERVER DATA 272

CAUSE THE CLIENT DEVICE TO UTILIZE THE RECEIVED SERVER DATA TO PERFORM THE CERTAIN FULFILLMENT OF THE ASSISTANT COMMAND 274

RECEIVE, VIA MICROPHONE(S) OF A CLIENT DEVICE OF A USER, AUDIO DATA CAPTURING A SPOKEN UTTERANCE DIRECTED TO AN AUTOMATED ASSISTANT 652

PROCESS, USING AN ON-DEVICE ASR MODEL STORED LOCALLY ON THE CLIENT DEVICE, THE AUDIO DATA TO IDENTIFY AN ASSISTANT COMMAND INCLUDED IN THE SPOKEN UTTERANCE 654

PROCESS, USING AN ON-DEVICE AMBIENT NOISE MODEL STORED LOCALLY ON THE CLIENT DEVICE, THE AUDIO DATA TO DETERMINE A GIVEN CATEGORY ASSOCIATED WITH AMBIENT NOISE CAPTURED IN THE AUDIO DATA, THE GIVEN CATEGORY BEING ONE OF A PLURALITY OF DISPARATE CATEGORIES 656

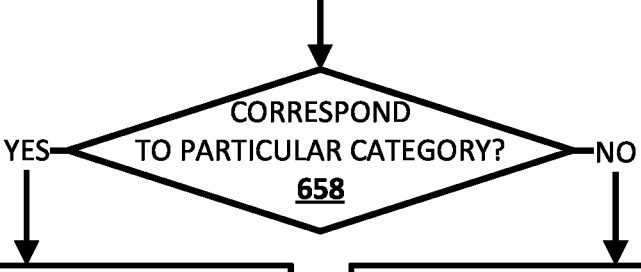

CORRESPOND TO PARTICULAR CATEGORY? 658

YES

NO

GENERATE A REQUEST TO BE TRANSMITTED TO A SERVER OR THIRD-PARTY APPLICATION TO OBTAIN DATA TO PERFORM CERTAIN FULFILLMENT OF THE ASSISTANT COMMAND 662

CAUSE THE CLIENT DEVICE TO OBTAIN AND UTILIZE DATA FROM A SERVER OR THIRD-PARTY APPLICATION TO PERFORM CERTAIN FULFILLMENT OF THE ASSISTANT COMMAND 660

CAUSE THE REQUEST TO BE TRANSMITTED TO THE SERVER OR THE THIRD-PARTY APPLICATION TO OBTAIN THE DATA, THE REQUEST BEING TRANSMITTED ALONG WITH AN INDICATION THAT ANY AUDIO DATA TRANSMITTED TO THE SERVER OR THE THIRD-PARTY APPLICATION CANNOT BE STORED BY THE SERVER OR THE THIRD-PARTY APPLICATION 664

CAUSE THE CLIENT DEVICE TO UTILIZE THE RECEIVED DATA TO PERFORM THE CERTAIN FULFILLMENT OF THE ASSISTANT COMMAND 666

FIG. 6

METHODS AND SYSTEMS FOR PROVIDING A SECURE AUTOMATED ASSISTANT

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by client devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), audio data of a spoken utterance of a user (or a text conversion thereof), and optionally data indicative of the user's identity (e.g., credentials). The cloud-based counterpart may perform various processing on the input to return result(s) to the automated assistant client, which may then provide corresponding output to the user. In other cases, automated assistants may be exclusively executed locally by client devices and that are engaged directly by users to reduce latency and/or to preserve privacy of users' data.

Many automated assistants either leverage the virtually limitless resources of the cloud to help automated assistant clients respond to users' inputs or are exclusively executed locally by client devices that are engaged directly by users to respond to the users' inputs. In other words, many automated assistants cannot dynamically switch between utilizing cloud-based counterpart(s) and executing locally by the client devices based on the users' inputs and/or ambient condition(s) associated with the users' inputs.

For example, assume a user provides a spoken utterance of "how is my XYZ stock doing today" as input to a given automated assistant. Further assume the given automated assistant leverages the virtually limitless resources of the cloud to help respond to the spoken utterance. In this example, the given automated assistant can respond to the user with the desired content (e.g., a real-time update on "XYZ stock"), but the security of the user's data may be reduced in that audio data capturing the spoken utterance, data indicative of the user's identity, an assistant command associated with the spoken utterance, and/or other data may be transmitted from a given client device that captured the spoken utterance to a server or third-party application to obtain the desired content responsive to the spoken utterance. As a result, after the data is transmitted to the server or the third-party application, the user may not be able to take one or more measures to ensure the transmitted data is secure at the server or the third-party application. In contrast, further assume the given automated assistant is executed locally at a given client device of the user to respond to the spoken utterance. In this example, the security of the user's data may be preserved, but the given automated assistant may only use content that is accessible locally at the given client device to obtain the desired content responsive to the spoken utterance (e.g., only an "XYZ stock" ticker symbol). As a result, the desired content responsive to the spoken utterance may be sub-optimal (e.g., stale) or non-existent. However, if automated assistants are capable of dynamically switching between utilizing cloud-based counterpart(s) and executing locally by the client devices based on the users' inputs and/or ambient condition(s) associated with the users' inputs, the automated assistants may be able to provide optimal desired content responsive to the users' input while preserving the security of the users' data.

SUMMARY

Implementations disclosed herein are directed to providing a secure automated assistant that prompts a user to consent to transmitting a request to server(s) and/or third-party application(s) when data from the server(s) and/or the third-party application(s) is needed to perform certain fulfillment of an assistant command. The assistant command can be included in user input (e.g., spoken input and/or typed input) detected at a client device. In some implementations, the user input can be processed to determine a given category associated with the assistant command, and the user may only be prompted to consent to transmitting of the request in response to determining the given category associated with the assistant command corresponds to one or more particular categories. In response to determining the user consents to transmitting of the request responsive to the prompt, the request can be transmitted to the server(s) and/or the third-party applications to obtain the data needed to perform the certain fulfillment of the assistant command. In response to determining that the user does not consent to transmitting of the request responsive to the prompt, on-device data can be obtained to perform alternate fulfillment of the assistant command. In various implementations, when the user does consent to transmitting of the request to the server(s) and/or the third-party application(s), the request can be transmitted along with an indication that no data received from the client device can be stored (e.g., non-transiently). In other words, the server(s) and/or the third-party application(s) can utilize data included in the request to generate responsive content for the request, but should discard the data included in the request subsequent to generating the responsive content.

For example, assume a user provides a spoken utterance of "can you recommend a lawyer for bankruptcies" directed to the automated assistant. The automated assistant (e.g., an automated assistant client executing locally at a client device) can cause audio data that captures the spoken utterance to be processed using one or more machine learning (ML) models (e.g., stored locally at the client device). For example, an automated assistant client can process the audio data to determine the spoken utterance includes an assistant command. For instance, the automated assistant client can process the audio data using locally stored automatic speech recognition (ASR) model(s) to generate a recognition of the spoken utterance and can process the recognition using natural language processing (NLP) model(s) to generate intent(s) of the assistant command included in the spoken utterance and parameter(s) for those intent(s), and/or can process the recognition using other ML model(s)). Further, the automated assistant can process output, generated using one or more of the ML models, to determine a given category associated with the assistant command. In this example, the given category associated with the assistant command can be a legal services category. Moreover, the automated assistant can determine the legal services category corresponds to one or more particular categories (e.g., using rule(s) and/or ML model(s)) for prompting the user that provided the spoken utterance for consent prior to transmitting any request to server(s) and/or third-party application(s) to obtain responsive content for the spoken utterance. As a result, the automated assistant can prompt the user to consent to transmitting the request to the server(s) and/or to third-party application(s) to obtain recommendations for a bankruptcy lawyer. Assuming the user consents to the transmitting of the request, the automated assistant can generate and transmit the request to perform the certain fulfillment of obtaining recommendations for a bankruptcy lawyer as requested by the user (and optionally along with an indication that the request cannot be stored at the server(s) and/or third-party application(s) that receive the request). However, if the user does not consent to the transmitting of the request, the automated assistant can obtain data that is local to the client device to perform an alternate fulfillment, such as providing any pre-cached content associated with recommendations for a bankruptcy lawyer, providing any contact entries for lawyers or law firms from a contact list, and/or providing any other data that is related to the assistant command. Additionally, or alternatively, if there is no content related to the assistant command, the assistant command may fail and the automated assistant can cause a notification to be provided for presentation to the user that any fulfillment cannot be performed without transmitting the request to the server(s) and/or the third-party application(s).

In some implementations, the given category associated with the assistant command can be one of a plurality of disparate categories. The plurality of disparate categories can be defined by a taxonomy with varying degrees of granularity. For example, the plurality of disparate categories can include a search query category, a multimedia category, an IoT device category, a communications category, a task category, and/or other categories. Further, each of these disparate categories can include one or more categories (or sub-categories). For example, the search query category can include an entities category corresponding to search queries associated with persons, places, and/or things, a pecuniary category corresponding to search queries associated with stocks, bank account balances, and/or other pecuniary information, a weather category corresponding to search queries associated with inquiries about weather at a particular location, a restaurant category corresponding to search queries associated with restaurants, and/or any other category associated with disparate types of search queries. Further, each of these disparate categories (or sub-categories) can include one or more categories (or further sub-categories). For example, the entities categories can include a state category, a city category, a business location category, a residential location category, and/or other categories associated with locations, such as an address category; a famous person category, a contact entry category, and/or other categories associated with persons or personal information (e.g., an email address category, a phone number category, etc.), and so on. Although the above example is described with respect to categories for search queries, it should be understood that is for the sake of illustrating varying degrees of granularity for a given category and is not meant to be limiting. For instance, the multimedia category can include a music category that further includes a genre category that further includes a corresponding category for various genres of music, and so on.

In some implementations, the automated assistant can determine the given category, associated with the assistant command, based on output generated using one or more ML models. For example, when the user input is spoken input, audio capturing a spoken utterance of the user can be processed, using an ASR model to generate a plurality of speech hypotheses (e.g., term hypotheses and/or transcription hypotheses). One or more of the speech hypotheses can be selected as recognized text corresponding to the spoken utterance based on corresponding value(s) associated with each of the speech hypotheses (e.g. probabilities, log likelihoods, and/or other value(s)). Further, the recognized text can be processed, using NLP model(s), to determine an intent of the user in providing the spoken utterance, to determine parameter(s) for the intent, and/or to annotate the recognized text. The automated assistant can determine the given category based on the intent of the user, the parameter(s) of the intent, and/or the annotations of the recognized text. As another example, when the user input is typed input, the typed input can be processed, using NLP model(s), to determine an intent of the user in providing the spoken utterance, to determine parameter(s) for the intent, and/or to annotate the recognized text. Similarly, the automated assistant can determine the given category based on the intent of the user and/or the annotations of the recognized text.

In some implementations, the automated assistant can determine that the given category corresponds to one or more of the particular categories using one or more rules. The one or more rules can include, for example, user-defined rule(s), default rule(s), and/or inferred rule(s). For instance, a user-defined rule can be previously defined by a user (e.g., via an automated assistant application) and indicate one or more assistant commands associated with the given category should cause the automated assistant to prompt the user to request consent prior to transmitting any requests. The user-defined rule(s) may also indicate scenarios where the user should not be prompted for requests or define an extent to which the user consents to transmitting the request (e.g., transmit textual data to the server(s) and/or the third-party application, but not any audio data). Also, for instance, a default rule can indicate that one or more assistant commands associated with the given category should cause the automated assistant to prompt the user to request consent prior to transmitting any requests. These default rule(s) can be associated with, for example, pecuniary-related categories, medical-related categories, legal-related-categories, and/or other categories. Also, for instance, an inferred rule can be inferred based on usage of the client device. These inferred rule(s) can be associated with, for example, categories that the user previously consented to for transmitting requests from the client device (e.g., blanket consent or an extent of consent).

In some implementations, the automated assistant can cause the prompt to be rendered visually and/or audibly at the client device. The prompt can request that the user consent to the transmitting of the request to the server(s) and/or third-party application(s). In some versions of those implementations, the user can provide varying degrees of consent for transmitting the request (and optionally future requests) to the server and/or the third-party application(s). For example, the user can provide blanket consent for transmitting the request to obtain the data to perform the certain fulfillment of the assistant command (and optionally future requests also having the given category), for transmitting the request along with an indication that any data cannot be stored by the server(s) and/or the third-party application(s), for transmitting only textual data and not any audio data, for not transmitting any requests, and/or other extents. As described herein, the user can be prompted to provide consent for transmitting of the request to an automated assistant cloud (e.g., or any other first-party server), a local third-party application installed on the client device, a third-party application hosted by a third-party server, and/or any other server or third-party application. For example, the user can provide consent that data can be transmitted to the local-third-party application, but not a server-based instance of the third-party application. As another example, the user can provide consent that data can be transmitted to any first-party server, but not any third-party application(s) and/or third-party server(s).

In additional or alternative implementations, and when the user input is spoken input, audio data capturing the spoken input can be processed to determine a given category associated with any ambient noise that is also captured in the audio data, and the user may only be prompted to consent to transmitting of the request in response to determining the given category associated with the ambient noise corresponds to one or more particular categories. The automated assistant can cause audio data that captures the spoken utterance to be processed using one or more machine learning (ML) models to determine the spoken utterance includes an assistant command (e.g., automatic speech recognition (ASR) model(s), natural language processing (NLP) model(s), and/or other ML model(s)) as described above. The audio data can additionally or alternatively be processed using ambient noise model(s) trained to determine the given category associated with the ambient noise based on output generated using the ambient noise model(s). The output of the ambient noise model(s) can include, for example, a plurality of categories and corresponding value(s) (e.g., probabilities, log-likelihoods, etc.) associated with the plurality of categories.

In some implementations, the given category associated with the ambient noise can be one of a plurality of disparate categories. Similar to the plurality of categories associated with the assistant commands, the plurality of disparate categories associated with the ambient noise can be defined by a taxonomy with varying degrees of granularity. For example, the plurality of disparate categories associated with the ambient noise can include a conversation category, a commuting category, a multimedia category, and/or other categories. Further, the plurality of disparate categories for the ambient noise can include one or more categories (or sub-categories) similar to the plurality of disparate categories of the assistant commands. For example, the conversation category can include a category for a plurality of disparate users (e.g., identified using voice identification model(s)).

In some implementations, the automated assistant can determine the given category corresponds to one or more of the particular categories using one or more rules. The one or more rules can include, for example, user-defined rule(s), default rule(s), and/or inferred rule(s) similar to those described above. However, these rules are associated with limiting transmitting of the request based on the ambient noise captured in the audio data that also captures the assistant command. For example, assume a spoken utterance of "can you recommend a lawyer for bankruptcies" is directed to the automated assistant. Further assume audio data capturing the spoken utterance also captures a conversation between multiple other users in ambient noise based on output generated using the ambient noise model(s). In this example, the prompt may additionally or alternatively include an indication that the audio data captures the conversation of the multiple other users (and optionally identifying those other users).

By using techniques described herein, one or more technical advantages can be achieved. For example, the techniques described herein enable the automated assistant to limit when and/or what data generated locally on a client device is transmitted to server(s) and/or third-party application(s), thereby improving privacy and security of user data. For instance, techniques described herein can proactively prompt the user, prior to transmitting certain data, and can require affirmative input in response to the prompt before the certain data is transmitted, or can prevent transmission of the certain data if the affirmative input is not received (e.g., negative is input instead received). This can ensure that the certain data remains secure without relying on the user to manually specify, before issuing the assistant command, whether the certain data should remain secure.

As another example, the techniques described herein enable the automated assistant to selectively inform a user when and/or what data will be transmitted from a client device responsive to an assistant command provided by the user, and enable the user to provide concise input (e.g., a spoken "yes" or "no", or a single tap of a graphical interface element) to dictate whether such data should be transmitted. This concise input can be more efficient than, for example, the multiple inputs that can be required to navigate menu(s) of an automated assistant application to manually identify data settings and specify those data settings. Further, providing the prompts in conjunction with the automated assistant requests enables the user to more readily comprehend to which type(s) of data the user response to the prompt will apply as opposed to manually defining rules associated with various categories that may be obtuse to the user. Yet further, user responses to prompts can be used to dictate whether future user data (e.g., having the same category or categories) should be transmitted. This can reduce or eliminate the need for the user to provide future user input relating to the transmission of future user data.

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 depicts a flowchart illustrating an example method of determining whether to transmit a request to a server to obtain server data utilized in performance of certain fulfillment of an assistant command, in accordance with various implementations.

FIG. 6 depicts a flowchart illustrating an example method of determining whether to transmit a request to a server or third-party application to obtain data utilized in performance of certain fulfillment of an assistant command based on ambient noise(s), in accordance with various implementations.

DETAILED DESCRIPTION

Figure 1:
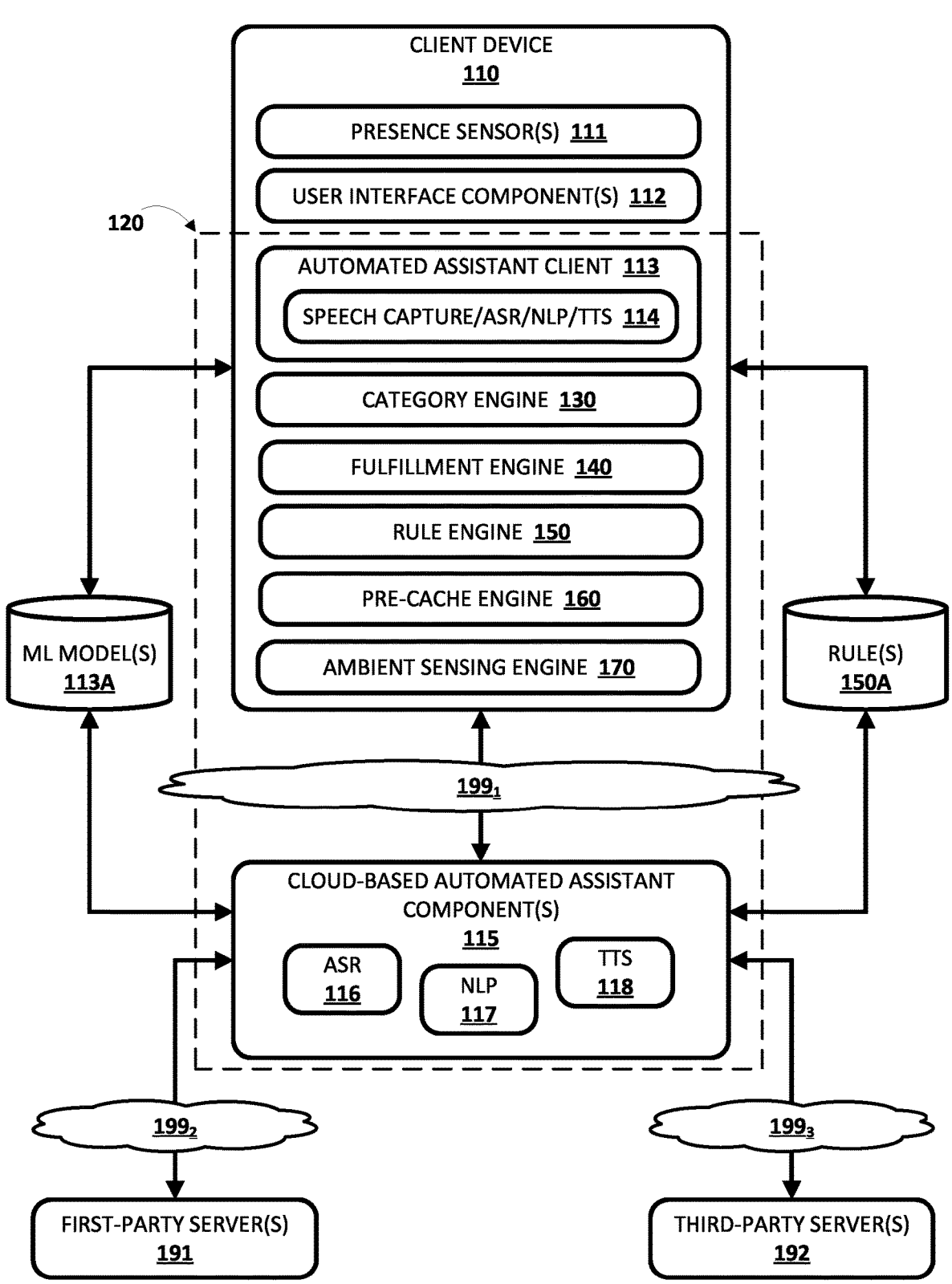
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110, one or more cloud-based automated assistant components 115, one or more first-party servers 191, and one or more third-party servers 192.

The client device 110 can execute an automated assistant client 113. The automated assistant client 118 can be an application that is separate from an operating system of the client device 110 (e.g., installed "on top" of the operating system)—or can alternatively be implemented directly by the operating system of the client device 110. As described further below, the automated assistant client 118 can optionally interact with one or more of the cloud-based automated assistant components 115 in responding to various requests provided by user interface component(s) 112 of the client device 110. Further, and as also described below, other engine(s) of the client device 110 can optionally interact with one or more of the cloud-based automated assistant components 115.

One or more the cloud-based automated assistant components 115 can be implemented on one or more computing systems (e.g., server(s) collectively referred to as a "cloud" or a "remote" computing system) that are communicatively coupled to the client device 110 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 115 with the client device 110 is indicated generally by $199_1$ of FIG. 1. Also, in some implementations, the client device 110 may be communicatively coupled with other client devices (not depicted) via one or more networks (e.g., LANs and/or WANs).

One or more of the cloud-based automated assistant components 115 can also be communicatively coupled with one or more of the first-party servers 191 and/or one or more of the third-party servers via one or more networks (e.g., LANs, WANs, and/or other networks). The communicative coupling of the cloud-based automated assistant components 115 with the one or more of the first-party servers 191 is indicated generally by $199_2$ of FIG. 1. Further, the communicative coupling of the cloud-based automated assistant components 115 with the one or more of the third-party servers 192 is indicated generally by $199_3$ of FIG. 1. In some implementations, and although not depicted in FIG. 1, the client device can additionally or alternatively be communicatively coupled with one or more of the first-party servers 191 and/or one or more of the third-party servers via one or more networks (e.g., LANs, WANs, and/or other networks).

The automated assistant client 113, by way of its interactions with one or more of the cloud-based automated assistant components 115, may form what appears to be, from a user's perspective, a logical instance of an automated assistant 120 with which the user of the client device 110 may engage in a human-to-computer dialog. For example, an instance of the automated assistant 120 encompassed by a dashed line includes the automated assistant client 113 of the client device 110 and one or more cloud-based automated assistant components 115. It thus should be understood that each user that engages with the automated assistant client 113 executing on the client device 110 may, in effect, engage with his or her own logical instance of the automated assistant 120 (or a logical instance of the automated assistant 120 that is shared amongst a household or other group of users and/or shared amongst multiple automated assistant clients 113). Although only the client device 110 is illustrated in FIG. 1, it is understood that one or more of cloud-based automated assistant components 115 can additionally serve many additional groups of client devices.

As used herein, a first-party device or system (e.g., the one or more first-party servers 191) references a system that is controlled by a party that is the same as the party that controls the automated assistant 120 referenced herein. For example, the one or more first-party servers 191 can reference a system that hosts a search engine service, a communications service (e.g., email, SMS messaging, etc.), a navigation service, a music service, a document editing or sharing service, and/or other services that are controlled a party that is the same as the party that controls the automated assistant 120 referenced herein. In contrast, a third-party device or system (e.g., the one or more third-party servers 192) references a system that is controlled by a party that is distinct from the party that controls the automated assistant 120 referenced herein. For example, the one or more third-party servers 192 can reference a system that hosts the same services, but those services are controlled by a party that is different from the party that controls the automated assistant 120 referenced herein.

The client device 110 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant 120. Additional and/or alternative client devices may be provided.

In various implementations, the client device 110 may include one or more presence sensors 111 that are configured to provide, with approval from corresponding user(s), signals indicative of detected presence, particularly human presence. In some of those implementations, the automated assistant 120 can identify the client device 110 (or another computing device associated with a user of the client device 110) to satisfy a spoken utterance (or other input directed to the automated assistant 120) based at least in part of presence of the user at the client device 110 (or at another computing device associated with the user of the client device 110). The spoken utterance (or other input directed to the automated assistant 120) can be satisfied by rendering responsive content (e.g., audibly and/or visually) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance (or other input directed to the automated assistant 120). As described herein, the automated assistant 120 can leverage data determined based on the presence sensors 111 in determining the client device 110 (or other computing device(s)) based on where a user is near or was recently near, and provide corresponding commands to only the client device (or those other computing device(s)). In some additional or alternative implementations, the automated assistant 120 can leverage data determined based on the presence sensors 111 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 111 may come in various forms. For example, the client device 110 may be equipped with one or more digital cameras that are configured to capture and provide signal(s) indicative of movement detected in their fields of view. Additionally, or alternatively, the client device 110 may be equipped with other types of light-based presence sensors 111, such as passive infrared ("PIR") sensors that measure infrared ("IR") light radiating from objects within their fields of view. Additionally, or alternatively the client device 110 may be equipped with presence sensors 111 that detect acoustic (or pressure) waves, such as one or more microphones.

Additionally, or alternatively, in some implementations, the presence sensors 111 may be configured to detect other phenomena associated with human presence or device presence. For example, in some embodiments, the client device 110 may be equipped with a presence sensor 111 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the assistant device. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform voice recognition to recognize a user from their voice. For example, some instances of the automated assistant 120 may be configured to match a voice to a user's profile, e.g., for purposes of providing/restricting access to various resources. In some implementations, movement of the speaker may then be determined, e.g., by the presence sensors 111 of the client device 110 (and optionally GPS sensors and/or accelerometers). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 120, especially if not much time has passed since the last engagement.

The client device 110 further respective user interface component(s) 112, which can include one or more user interface input devices (e.g., microphone(s), touchscreen, keyboard, and/or other input devices) and/or one or more user interface output devices (e.g., display, speaker, projector, and/or other output devices). Further, the client device 110 and/or any other computing device(s) may include one or more memories for storage of data and software applications, one or more processors for accessing data and executing applications, and other components that facilitate communication over a network. The operations performed by the client device 110, other computing device(s), and/or by the automated assistant 120 may be distributed across multiple computer systems. The automated assistant 120 may be implemented as, for example, computer programs running on one or more computers in one or more locations that are coupled to each other through a network (e.g., the network(s) 199 of FIG. 1).

As noted above, in various implementations, the client device 110 may operate the automated assistant client 113. In various embodiments, the automated assistant client 113 may include a speech capture/automatic speech recognition (ASR)/natural language processor (NLP)/text-to-speech (TTS) module 114. In other implementations, one or more aspects of the respective speech capture/ASR/NLP/TTS module 114 may be implemented separately from the automated assistant client 113 (e.g., by one or more of the cloud-based automated assistant components 119).

The speech capture/ASR/NLP/TTS module 114 may be configured to perform one or more functions including, for example: capture a user's speech (speech capture, e.g., via respective microphone(s) (which in some cases may comprise one or more of the presence sensors 105)); convert that captured audio to recognized text and/or to other representations or embeddings (ASR) using ASR model(s) stored in the machine learning (ML) model(s) database 113A; parse and/or annotate the recognized text using natural language processing (NLP) model(s) stored in the ML model(s) database 113A; and/or convert text-to-speech using speech synthesis model(s) stored in the ML model(s) database 113A. Instance(s) of these ML model(s) may be stored locally at the client device 110 and/or accessible by the client device 110 (e.g., over the network(s) 199 of FIG. 1). In some implementations, because one or more of the assistant input devices 106 may be relatively constrained in terms of computing resources (e.g., processor cycles, memory, battery, etc.), the respective speech capture/ASR/NLP/TTS module 114 that is local to the client device 110 may be configured to convert a finite number of different spoken phrases to text (or to other forms, such as lower dimensionality embeddings) using the speech recognition model(s). Some speech input may be sent to one or more of the cloud-based automated assistant components 115, which may include a cloud-based ASR module 116, a cloud-based NLP module 117, and/or a cloud-based TTS module 118.

Cloud-based ASR module 116 may be configured to leverage the virtually limitless resources of the cloud to convert audio data captured by speech capture/ASR/NLP/TTS module 114 into text (which may then be provided to the cloud-based NLP module 117) using ASR model(s) stored in the ML model(s) database 113A. The cloud-based TTS module 118 may be configured to leverage the virtually limitless resources of the cloud to convert textual data (e.g., text formulated by automated assistant 120) into computer-generated speech output using speech synthesis model(s) stored in the ML model(s) database 113A. In some implementations, the cloud-based TTS module 118 may provide the computer-generated speech output to the client device 110 and/or other computing device(s) to be output directly, e.g., using speaker(s) of the client device 110 and/or other computing device(s). In other implementations, textual data (e.g., a client device notification included in a command) generated by the automated assistant 120 using the cloud-based TTS module 118 may be provided to speech capture/ASR/NLP/TTS module 114 of the client device 110 and/or other computing device(s), which may then locally convert the textual data into computer-generated speech using the speech synthesis model(s) stored in the ML model(s) database 113A, and cause the computer-generated speech to be rendered via speaker(s) of the client device 110 and/or other computing device(s).

The cloud-based NLP module 117 processes natural language input generated by users via the user interface component(s) 112 of the client device 110 and/or other computing device(s) and may generate annotated output for use by one or more other components of the automated assistant 120. For example, the cloud-based NLP module 117 may process natural language free-form input (e.g., spoken input and/or typed input) that is generated by a user via user interface component(s) 112 of the client device 110. The annotated output generated based on processing the natural language free-form input may include one or more annotations of the natural language input and optionally one or more (e.g., all) of the terms of the natural language input. These annotations can include, for example, intent(s) determined based on processing the natural language input, slot value(s) for parameter(s) associated with determined intent(s), labels corresponding to entities included in the natural language input for entities, parts of speech, and/or other information included in the natural language input, and/or other annotations.

In some implementations, the cloud-based NLP module 117 is configured to identify and annotate various types of grammatical information in natural language input. For example, the cloud-based NLP module 117 may include a part of speech tagger configured to annotate terms with their grammatical roles. In some implementations, the cloud-based NLP module 117 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger of the cloud-based NLP module 117 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the cloud-based NLP module 117 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the cloud-based NLP module 117 may rely on annotations from one or more other components of the cloud-based NLP module 117. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the cloud-based NLP module 117 may use related data outside of the particular natural language input to determine one or more annotations—such as notification rendered by the automated assistant 120 at the client device 110 immediately prior to receiving the natural language input on which the notification is based.

Although particular functionality is described with respect to being performed by one or more of the cloud-based components 115 (e.g., the cloud-based ASR module 115, the cloud-based NLP module 117, and the cloud-based TTS module 118), it should understood that is for the sake of example and is not meant to be limiting. For example, in various implementations, the speech capture/ASR/NLP/TTS module 114 can perform the same or similar functionality (module 114 can do the same on-device) locally at the client device 110 without interacting with the cloud-based auto-mated assistant components 115.

In various implementations, the client device 110 can further include various engines. For example, and as depicted in FIG. 1, the client device 110 can further include a category engine 130, a fulfillment engine 140, a rule engine 150, a pre-cache engine 160, and an ambient sensing engine 170. In some implementations, these various engines can be executed exclusively on the client device 110. In additional or alternative implementations, one or more of these various engines can be executed remotely from the client device 110 (e.g., as part of the cloud-based automated assistant components 115).

The category engine 130 can process user input directed to the automated assistant 120 to determine a given category associated with an assistant command included in the user input. The given category associated with the assistant command can be one of a plurality of disparate categories. The plurality of disparate categories can be defined by a taxonomy with varying degrees of granularity. For example, the plurality of disparate categories can include a search query category, a multimedia category, an IoT device category, a communications category, a task category, and/or other categories. Further, each of these disparate categories can include one or more categories (or sub-categories). For example, the search query category can include an entities category corresponding to search queries associated with persons, places, and/or things, a pecuniary category corresponding to search queries associated with stocks, bank account balances, and/or other pecuniary information, a weather category corresponding to search queries associated with inquiries about weather at a particular location, a restaurant category corresponding search queries associated with restaurants, and/or any other category associated with disparate types of search queries. Further, each of these disparate categories (or sub-categories) can include one or more categories (or further sub-categories). For example, the entities categories can include a state category, a city category, a business location category, a residential location category, and/or other categories associated with locations, such as an address category; a famous person category, a contact entry category, and/or other categories associated with persons or personal information (e.g., an email address category, a phone number category, etc.), and so on. Although the above example is described with respect to categories for search queries, it should be understood that is for the sake of illustrating varying degrees of granularity for a given category and is not meant to be limiting. For instance, the multimedia category can include a music category that further includes a genre category that further includes a corresponding category for various genres of music, and so on.

In some implementations, the category engine 130 can cause the user input to be processed, using one or more ML models stored in the ML model(s) database 113A, to determine the given category associated with the assistant command included in the user input. For example, in implementations where the user input is a spoken utterance directed to the automated assistant 120, the category engine 130 can cause the speech capture/ASR/NLP/TSS module 114 to process, using an ASR model, audio data corresponding to the spoken utterance to generate a plurality of speech hypotheses for the spoken utterance and a given speech hypotheses can be selected as recognized text corresponding to the spoken utterance. Further, the category engine 130 can cause the speech capture/ASR/NLP/TSS module 114 to process, using one or more NLP models, the recognized text to annotate the recognized text corresponding to the spoken utterance. The category engine 130 can determine the given category associated with the assistant command based on the annotations of the recognized text. For instance, assume a user provides a spoken utterance of "How's my XYZ stock doing today". The annotations for the spoken utterance may correspond to, for example, "pecuniary", "stocks", "search query", and/or other annotations. Based on these annotations, the category engine 130 can determine the spoken utterance corresponds to a search query category, a pecuniary information category, a stocks category, and/or another given category. As another example, in implementations where the user input is typed input directed to the automated assistant 120, the category engine 130 can cause the speech capture/ASR/NLP/TSS module 114 to process, using one or more of the NLP models, text corresponding to the typed input to annotate the text, and the category engine 130 can determine the given category associated with the assistant command based on the annotations.

The fulfillment engine 140 can generate fulfillment data that is utilized to perform fulfillment of various assistant commands described herein. The fulfillment data can take various forms obtained by the fulfillment engine 140 can take various forms. For example, assume a user provides a spoken utterance of "Where were the outdoor shots of 'The Shining' filmed?" Further assume audio data capturing the spoken utterance can be processed, using an ASR model stored in the ML model(s) database 113A, to generate recognized text, and the recognized text can be processed, using an NLP model stored in the ML model(s) database 113A to determine an intent of the user and any slot value(s) for parameter(s) associated with the intent. In this example, the intent of the user that provided the spoken utterance may be determined as being a search query intent having a slot value of "Where were the outdoor shots of 'The Shining' filmed?" for a query parameter. The intent and the slot value for the query parameter may be provided to the fulfillment engine 130, and the fulfillment engine 130 can generate the fulfillment data for the search query. The fulfillment data generated based on the search query can include data indicative of the search query, such as the text of the query, a reduced dimensionality embedding representing the search query, and/or other data. Further, the automated assistant 120 can cause the fulfillment data to be transmitted to a search engine (e.g., executing at one or more of the first party servers 191 and/or one or more of the third party servers 192) to obtain responsive content to be presented to the user responsive to the search query. For example, the responsive content can include GPS coordinates, or other more explicit information, such as "Timberline Lodge, Mt. Hood, Oregon." Although the above example is provided with respect to an assistant command being a search query, it should be understood that is for the sake of example and is not meant to be limiting. For example, other assistant commands may include ordering a good/service, starting a timer, setting a reminder, initiating a phone call, playing media, sending a message, etc.

In some implementations, the fulfillment engine 140 can determine a type of fulfillment data that is needed to perform a certain fulfillment of the assistant command based on the assistant command and/or the given category associated with the assistant command. The type of fulfillment data can include, for example, client device data generated by the client device 110 (e.g., generated by the automated assistant 120), third-party application data generated by one or more third-party applications accessible by the client device 110, server data generated by one or more of the first-party servers 191 or third-party servers 192, and/or other types of fulfillment data. Continuing with the above example, and as noted above, the fulfillment data generated based on the search query "Where were the outdoor shots of 'The Shining' filmed?" can be transmitted to a search engine (e.g., executing at one or more of the first party servers 191 and/or third party servers 192) to obtain responsive content to be presented to the user responsive to the search query. In this example, the fulfillment needed to perform the certain fulfillment of obtaining the responsive content can be server data because the search engine utilized to obtain the responsive content is executed by one or more servers (e.g., one or more of the first party servers 191 and/or third party servers 192).

In additional or alternative implementations, the fulfillment engine 140 can determine a type of fulfillment data that is needed to perform a certain fulfillment of the assistant command based on one or more contextual signals associated with the client device 110. The one or more contextual signals can include, for example, capabilities of a given server (e.g., one or more of the first-party servers 191 and/or the third-party servers) and/or a given application that is accessible at the client device 110 (e.g., one or more first-party applications and/or third-party applications), whether a given application (e.g., one or more first-party applications and/or third-party applications) is operating in a foreground or background of the client device 110, and/or other contextual signals associated with the client device 110. The automated assistant 120 can determine the capabilities of the given server and/or the given application based on the given server and/or the given application providing an indication of the capabilities to the automated assistant 120 (e.g., by publishing one or more assistant commands that the given server and/or the given application can fulfill to the automated assistant 120), based on content currently displayed in the foreground of the client device 110 by the given application, based on a type of expected entity by the given server and/or the given application matching a type of entity included in a given assistant command, and/or based on other signals.

The type of fulfillment data can include, for example, client device data generated by the client device 110 (e.g., generated by the automated assistant 120), third-party application data generated by one or more third-party applications accessible by the client device 110, server data generated by one or more of the first-party servers 191 or third-party servers 192, and/or other types of fulfillment data. Continuing with the above example, and as noted above, the fulfillment data generated based on the search query "Where were the outdoor shots of 'The Shining' filmed?" can be transmitted to a search engine (e.g., executing at one or more of the first party servers 191 and/or third party servers 192) to obtain responsive content to be presented to the user responsive to the search query. In this example, the fulfillment needed to perform the certain fulfillment of obtaining the responsive content can be server data because the search engine utilized to obtain the responsive content is executed by one or more servers (e.g., one or more of the first party servers 191 and/or third party servers 192).

The rule engine 150 can determine whether the given category corresponds to one or more particular categories. The one or more particular categories can include a subset of the plurality of disparate categories and can similarly be defined with varying degrees of granularity. In some implementations, the rule engine 150 can determine whether the given category corresponds to one or more particular categories using one or more rules stored in rule(s) database 150A. In these implementations, the one or more rules can include, for example, user-defined rule(s) that indicate any assistant commands associated with the given category correspond to one or more of the particular categories (e.g., certain types of queries can always be fulfilled using certain types of fulfillment data, etc.), default rule(s) that indicate any assistant commands associated with the given category correspond to one or more of the particular categories (e.g., pecuniary information queries, medical queries, event queries, etc.), inferred rule(s) that indicate prior assistant commands associated with the given category correspond to one or more of the particular categories, and/or other rule(s). In additional or alternative implementations, the rule engine 150 can determine whether the given category corresponds to one or more particular categories using one or more ML models stored in the ML model(s) database 113A. In these implementations, one or more of the ML models can be trained to generate a semantic embedding (or any other lower dimensional representation) for the given category based on processing an indication of the given category. The semantic embedding can be compared, in an embedding space, to previously generated embeddings for the one or more particular categories, and the given category may be considered to correspond to one or more of the particular categories if the semantic embedding is within a threshold distance of a corresponding one of the previously generated embeddings.

In some implementations, in response to determining the given category corresponds to one or more particular categories, the automated assistant 120 can generate a prompt that requests the user consent to transmitting a request that includes the fulfillment data based the type of fulfillment data that is needed to perform the certain fulfillment of the assistant command. For example, if server data from a server (e.g., one or more of the first-party servers 191 and/or the third-party servers 192) is needed to perform the certain fulfillment, and the given category corresponds to one or more of the particular categories, then the automated assistant 120 can generate a prompt that requests the user consent to transmitting a request to obtain the server data to perform the certain fulfillment. As another example, if third-party application data from a third-party application accessible at the client device 110 (e.g., installed on the client device 110 or accessible by the client device 110 over the network(s) 199) is needed to perform the certain fulfillment, and the given category corresponds to one or more of the particular categories, then the automated assistant 120 can generate a prompt that requests the user consent to transmitting a request to obtain the third-party application data to perform the certain fulfillment. Further the automated assistant 120 can cause the prompt to be provided for presentation to the user (e.g., audibly and/or visually) via one or more of the user interface components 112 of the client device 110. However, in response to determining the given category does not correspond to one or more of the particular categories, the automated assistant 120 can transmit the fulfillment data to obtain the responsive content without prompting the user.

For example, assume a user provides a spoken utterance of "How's my XYZ stock doing today", and the category engine 130 determines the spoken utterance corresponds to a pecuniary information category. Further assume the fulfillment engine 140 determines that, to obtain responsive content to the spoken utterance (e.g., a stock update on the user's XYZ stock), the automated assistant 120 needs to transmit a request to a given third-party server associated with the user's financial institution. Moreover, assume the rule engine 150 determines that the pecuniary information category corresponds to one or more of the particular categories based on the user previously defining a rule (or a default rule) that indicates any search queries related to pecuniary information correspond to one or more of the particular categories. Accordingly, the automated assistant 120 can generate a prompt that requests the user consents to transmitting the request to the given third-party server associated with the user's financial institution. In response to receiving consent from the user of the client device 110 to transmit the request, the automated assistant 120 can cause the request to be transmitted. In transmitting the request, the automated assistant 120 can optionally include an indication that the request itself and/or other data transmitted along with the request (e.g., audio data capturing the spoken utterance) cannot be stored (e.g., non-transiently) remotely by the given third-party server associated with the user's financial institution. Accordingly, the automated assistant 120 can ensure that certain data of the user of the client device 110 is secure and private in that the user is aware of any data that is being transmitted from the client device 110 and in that any data that is transmitted does not persist anywhere except locally on the client device 110.

In contrast, assume the user does not consent to the transmitting the request in response to the automated assistant 120 providing the prompt for presentation to the user. In this example, the automated assistant 120 can generate client data locally at the client device as alternate fulfillment of the assistant command. For instance, pre-cache engine 160 may have previously cached content for fulfillment of the assistant command. However, this pre-cached content for fulfillment of the assistant command may not correspond to the content needed for the certain fulfillment of the assistant command. Rather, the automated assistant 120 can use this pre-cached content as alternate fulfillment of the assistant command. Continuing with the above example, the pre-cache engine 160 may have previously cached content associated with a ticker symbol of XYZ stock or historical trends of XYZ stock. Accordingly, if the user does not consent transmitting the request to the given third-party server associated with the user's financial institution for a real-time update, then the automated assistant 120 can cause this pre-cached content that is local to the client device 110 to be provided for presentation to the user of the client device 110.

The pre-cache engine 160 can periodically transmit requests to various servers and/or third-party applications to obtain the pre-cached content. In some implementations, the pre-cache engine 160 can obtain pre-cached content for a threshold quantity of frequent assistant commands that are provided by the user of the client device and/or other users. For example, if the user frequently requests stock updates, then the pre-cache engine 160 can obtain pre-cached content for stock updates (e.g., ticker symbols, historical trends, future projections, etc.). The pre-cached content may have been previously obtained by the automated assistant 120 by previously storing content obtained responsive to a most recent instance of the assistant command (where the user previously consented to transmitting the request), by requesting certain content items at certain times of day (e.g., pre-caching information about the user's particular stocks every morning or for other certain stocks (e.g., based on popularity)), and/or by other means. As another example, if the user frequently provides smart device control commands, then the pre-cache engine 160 can obtain pre-cached content for controlling one or more smart devices associated with the user of the client device 110. By providing the pre-cached content, the user of the client device 110 is still provided with some responsive content, although it may not be the certain fulfillment initially desired by the user of the client device 110.

In additional or alternative implementations, the automated assistant 120 can generate a prompt that requests the user consent to transmitting a request that includes the fulfillment data based on features of the user input, and can provide the prompt for presentation to the user. In these implementations, the automated assistant 120 can generate the prompt based on the features of the user input even if the given category of the assistant command included in the user input does not correspond to one or more of the particular categories as described herein. The features of the user input can include, for example, corresponding value(s) associated with each of the speech hypotheses generated using the ASR model(s) (e.g., via the speech capture/ASR/NLP/TTS module 114 and/or the ASR module 116) when the user input is spoken input, an audio level of a spoken utterance when the user input is spoken input, and/or other features of the user input. For example, if the automated assistant 120 is not confident in recognized text that is predicted to correspond to a spoken utterance (e.g., determined based on the corresponding value(s) for the plurality of speech hypotheses), then the automated assistant 120 can generate a prompt that requests the user verify the spoken utterance was directed to the automated assistant 120. This also provides the user with an opportunity to correct any ASR errors. As another example, if the automated assistant 120 determines that an audio level of a spoken utterance detected at the client device 110 fails to satisfy a threshold noise level, then the automated assistant 120 can generate a prompt that requests the user verify the spoken utterance was directed to the automated assistant 120. In other words, the automated assistant 120 can analyze the features of the user input to determine whether the user input was unintentional and/or misinterpreted, and include an indication of such in the prompt while optionally also requesting the user consent to the transmitting of the request.

In various implementations, such as when the user input corresponds to a spoken utterance of the user of the client device 110, the ambient sensing engine 170 can process, using one or more ambient noise models stored in the ML model(s) database 113A, audio data capturing the spoken utterance to determine whether the audio data also captures ambient noise corresponding to a given category. The given category for the ambient noise can also be one of a plurality of disparate categories that are also defined with varying degrees of granularity. For example, the plurality of disparate categories for the ambient noise can include a conversation category, a commuting category, a multimedia category, and/or other categories. Further, the plurality of disparate categories for the ambient noise can include one or more categories (or sub-categories) similar to the plurality of disparate categories of the assistant commands. For example, the conversation category can include a category for a plurality of disparate users (e.g., identified using voice identification model(s)).

In particular, the audio sensing engine 170 can process, using the ambient noise model(s), the audio data corresponding to the spoken utterance to generate output associated with one or more acoustic properties of the environment of the client device 110 (e.g., a noise level of the environment, a classification of ambient noise detected in the environment, and/or other acoustic properties of the environment). The ambient noise model(s) can be trained based on a plurality of training instances that each include training instance input and training instance output. The training instance input can each include audio data that captures the spoken utterance, and the corresponding training instance output can include ground truth label(s) corresponding to an ambient noise level captured in the audio data and/or a type of noise that is also captured in the audio data (e.g., people conversing (and optionally identities of those people), a vehicle moving, a television show or movie playing in the background, and/or other types of noises).

In some implementations, the output generated across the ambient noise model(s) may be a value corresponding to a noise level of the environment in which the user is located when the spoken utterance is received (e.g., a decibel level) and/or one or more labels corresponding to types of noises detected in the environment in which the user is located when the spoken utterance is received. For example, if the audio data corresponds to audio data captured while a user of the client device 110 is commuting to work via bus, then the output generated across the acoustic model(s) based on processing the audio data may be a "commuting" and/or "bus" label based on the noise generated by the bus, and/or a decibel level detected based on the bus moving (e.g., 90 dB, etc.). In additional or alternative implementations, the output generated across the ambient noise model(s) may be one or more labels corresponding to types of noises detected in the environment in which the user is located when the spoken utterance is received, and respective measures associated with each of the one or more labels (e.g., binary values, probabilities, log likelihoods, and/or other measures). For example, if the audio data corresponds to audio data captured while a user of the client device 110 is commuting to work via bus, then the output generated across the acoustic model(s) based on processing the audio data may be a "bus" label having an associated probability of 0.6 and a "car" label having an associated probability of 0.4, or a "bus" label having an associated value of 1.0 and a "car" label having an associated value of 0.0.

In some versions of these implementations, the automated assistant 120 can generate a prompt that identifies any ambient noises detected in the audio data and that requests the user of the client device 110 consent to transmitting the request to a third-party application and/or server to obtain responsive content in the same or similar manner described above. Based on further user input received responsive to the prompt, the automated assistant 112 may or may not transmit the request to the third-party application and/or server. In some additional or alternative versions of those implementations, in transmitting the request to obtain the responsive content that is responsive to the spoken utterance, the automated assistant 120 can include an indication that any audio data transmitted along with the request cannot be stored (e.g., non-transiently) by a third-party application and/or a server that receives and processes the request. Accordingly, the automated assistant 120 can ensure that certain data of the user of the client device 110 is secure and private in that the user is aware of any data that is being transmitted from the client device 110 (even if inadvertently captured in the audio data) and in that any data that is transmitted does not persist anywhere except locally on the client device 110.

Although FIG. 1 is described with respect to a single client device having a single user, it should be understood that is for the sake of example and is not meant to be limiting. For example, one or more additional client devices of a user can also implement the techniques described herein. These additional client devices may be in communication with the client device 110 (e.g., over the network(s) 199). As another example, a given client device can be utilized by multiple users in a shared setting (e.g., a group of users, a household).

By using techniques described herein, one or more technical advantages can be achieved. For example, the techniques described herein enable the automated assistant to limit when and/or what data generated locally on a client device is transmitted to server(s) and/or third-party application(s), thereby improving security and privacy of user data. For instance, techniques described herein can proactively prompt the user, prior to transmitting certain data, and can require affirmative input in response to the prompt before the certain data is transmitted, or can prevent transmission of the certain data if the affirmative input is not received (e.g., negative is input instead received). This can ensure that the certain data remains secure without relying on the user to manually specify, before issuing the assistant command, whether the certain data should remain secure.

As another example, the techniques described herein enable the automated assistant to selectively inform a user when and/or what data will be transmitted from a client device responsive to an assistant command provided by the user, and enable the user to provide concise input (e.g., a spoken "yes" or "no", or a single tap of a graphical interface element) to dictate whether such data should be transmitted. This concise input can be more efficient than, for example, the multiple inputs that can be required to navigate menu(s) of an automated assistant application to manually identify data settings and specify those data settings. Further, providing the prompts in conjunction with the automated assistant requests enables the user to more readily comprehend to which type(s) of data the user response to the prompt will apply as opposed to manually defining rules associated with various categories that may be obtuse to the user. Yet further, user responses to prompts can be used to dictate whether future user data (e.g., having the same category or categories) should be transmitted. This can reduce or eliminate the need for the user to provide future user input relating to the transmission of future user data.

Turning now to FIG. 2, a flowchart illustrating an example method 200 of determining whether to transmit a request to a server to obtain server data utilized in performance of certain fulfillment of an assistant command is depicted. For convenience, the operations of the method 200 are described with reference to a system that performs the operations. This system of the method 200 includes one or more processors and/or other component(s) of computing device(s) (e.g., client device 110 of FIG. 1, client device 310 of FIGS. 3A and 3B, client device 410 of FIGS. 5A and 5B, client device 710 of FIGS. 7A and 7B, and/or computing device 810 of FIG. 8, one or more servers, and/or other computing devices). Moreover, while operations of the method 200 are shown in a particular order, this is not meant to be limiting. One or more operations may be reordered, omitted, and/or added.

At block 252, the system receives, via a client device of a user, user input directed to an automated assistant. The user input can include an assistant command to be performed by the automated assistant. In some implementations, the user input can be spoken input captured in audio data generated by microphone(s) of the client device, while in additional or alternative implementations, the user input can be typed input detected via an input device of the client device.

At block 254, the system processes, locally at the client device, the user input to determine a given category associated with an assistant command included in the user input, the given category being one of a plurality of disparate categories. The given category of the assistant command can be defined with varying degrees of granularity (e.g., described with respect to the category engine 130 of FIG. 1). In some implementations, such as when the user input is a spoken utterance, the system can process, using an on-device ASR model, audio data capturing the spoken utterance to generate recognized text. Further, the system can process, using NLP model(s), the recognized text to generate annotations for the recognized text, and the system can determine the given category based on the annotations. In additional or alternative implementations, such as when the user input is typed input At block 256, the system determines whether server data is needed to perform a certain fulfillment of the assistant command. In other words, the system determines whether a request needs to be transmitted to the server (e.g., one or more of the first-party servers 191 and/or third-party servers 192 of FIG. 1) to obtain responsive content to the assistant command included in the user input. The system can determine whether the request needs to be transmitted to the server based on, for example, a type of fulfillment data indicating that server data is needed to perform the certain fulfillment of the assistant command, capabilities of various servers, and/or other criteria. If, at an iteration of block 256, the system determines the server data is not needed to perform the certain fulfillment of the assistant command, the system proceeds to block 258. At block 258, the system causes the client device to generate and utilize data to perform a certain fulfillment of the assistant command. For example, if user input includes an assistant command to set a timer, set a reminder, and/or any other assistant command that can be performed locally at the client device, then the system can generate and utilize client data to perform the certain fulfillment of setting the timer, setting the reminder, etc. As another example, if user input includes an assistant command that is directed to a third-party application, then the system can utilize techniques described herein with respect to FIG. 4 to obtain third-party application data. The system returns to block 252 and performs a subsequent iteration of the method 200 when additional user input directed to the automated assistant is received via the client device of the user.

If, at an iteration of block 256, the system determines the server data is needed to perform the certain fulfillment of the assistant command, the system proceeds to block 260. For example, if user input includes an assistant command to perform a search query, control an IoT device, and/or any other assistant command where server data from a first-party server and/or third-party server is needed to perform the certain fulfillment, then the system proceeds to block 260. At block 260, the system determines whether the given category corresponds to one or more particular categories. The system can determine whether the given category corresponds to one or more of the particular categories using one or more rules (e.g., described with respect to the rule engine 150 of FIG. 1).

If, at an iteration of block 260, the system determines the given category does not correspond to one or more of the particular categories, the system proceeds to block 270. Block 270 is described below. If, at an iteration of block 260, the system determines the given category does correspond to one or more of the particular categories, the system proceeds to block 262. At block 262, the system generates a prompt that requests the user consent to transmitting a request to a server to obtain the server data needed to perform the certain fulfillment. At block 264, the system causes the prompt to be provided for presentation to the user via the client device. For example, assume user input includes an assistant command to execute a search query at a server to find a divorce lawyer, and assume that search queries related to obtaining legal services corresponds to one or more of the particular categories. In this example, the system can generate a prompt that indicates an automated assistant needs to transmit a request to a server to perform certain fulfillment (e.g., obtain search results for divorce lawyers), and that requests the user consent to transmitting of the search query to the server.

At block 266, the system determines whether additional user input is received that consents to transmitting the request to the server to obtain the server data. If, at an iteration of block 266, the system determines that no additional user input has been received or that additional input has been received that does not consent to the transmitting of the request, the system proceeds to block 268. For example, the system may refrain from transmitting the request to the server if the system determines the user provides additional user input that does not consent to the transmitting (e.g., dismissing the prompt or responding negatively to the prompt) or if the system determines the user ignores the prompt. In some implementations, the system may only monitor for the additional user input for a threshold duration of time of causing the prompt to be provided for presentation to the user.

At block 268, the system causes the client device to generate and utilize client data to perform an alternate fulfillment of the assistant command. In some implementations, such as when pre-cached content is available for the assistant command, the client data obtained to perform the alternate fulfillment can include obtaining the pre-cached content (e.g., described with respect to the pre-cache engine 160 of FIG. 1). In other implementations, the system can search the client device for any other data that may be utilized to perform any alternate fulfillment of the assistant command. In some implementations, the system can cause an indication that no fulfillment can be performed without obtaining the server data. The system returns to block 252 and performs a subsequent iteration of the method 200 when additional user input directed to the automated assistant is received via the client device of the user.

If, at an iteration of block 266, the system determines that additional user input that consents to the transmitting of the request, the system proceeds to block 270. At block 270, the system generates a request to be transmitted to the server to obtain the server data. At block 272, the system causes the request to be transmitted to the server to obtain the server data. At block 274, the system causes the client device to utilize the received server data to perform the certain fulfillment of the assistant command. In other words, if the user consents to the system transmitting the request to the server to obtain the server data, the system can perform the certain fulfillment of the assistant command as usual. In some implementations, in generating the request to transmit to the server, the system can include an indication that any client data transmitted to the server from the client device should not be stored or persist at the server. In some implementations, the user consenting to transmitting of the request can be utilized to update one or more rules. For example, if the user consents to transmitting of the search query to find the divorce lawyer to the server, the system may not prompt the user to consent to transmitting of search queries related to obtaining legal services in the future.

Figure 3A:
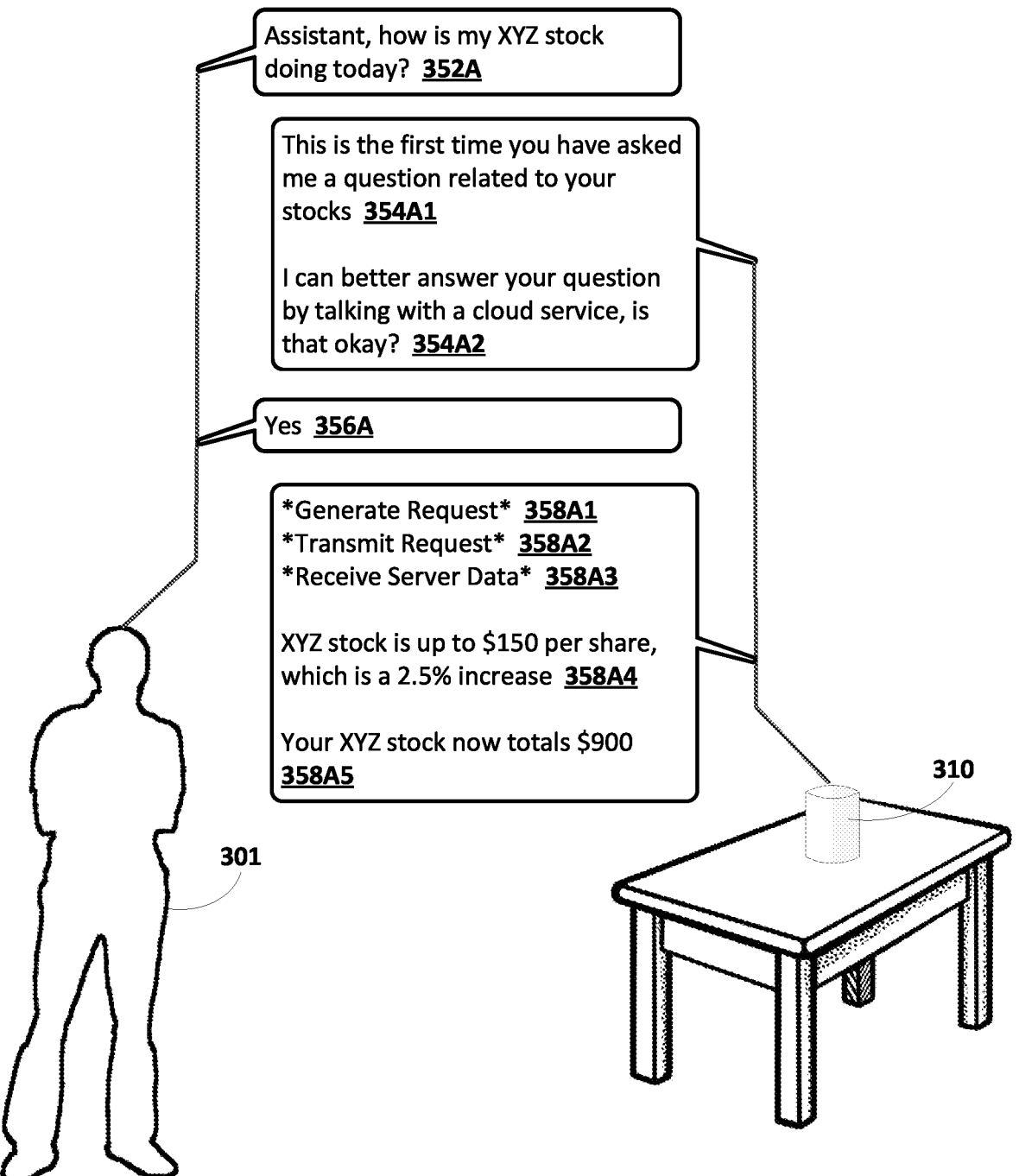
FIGS. 3A and 3B depict various non-limiting examples of determining whether to transmit a request to a server to obtain server data utilized in performance of certain fulfillment of an assistant command, in accordance with various implementations.
Figure 3B:
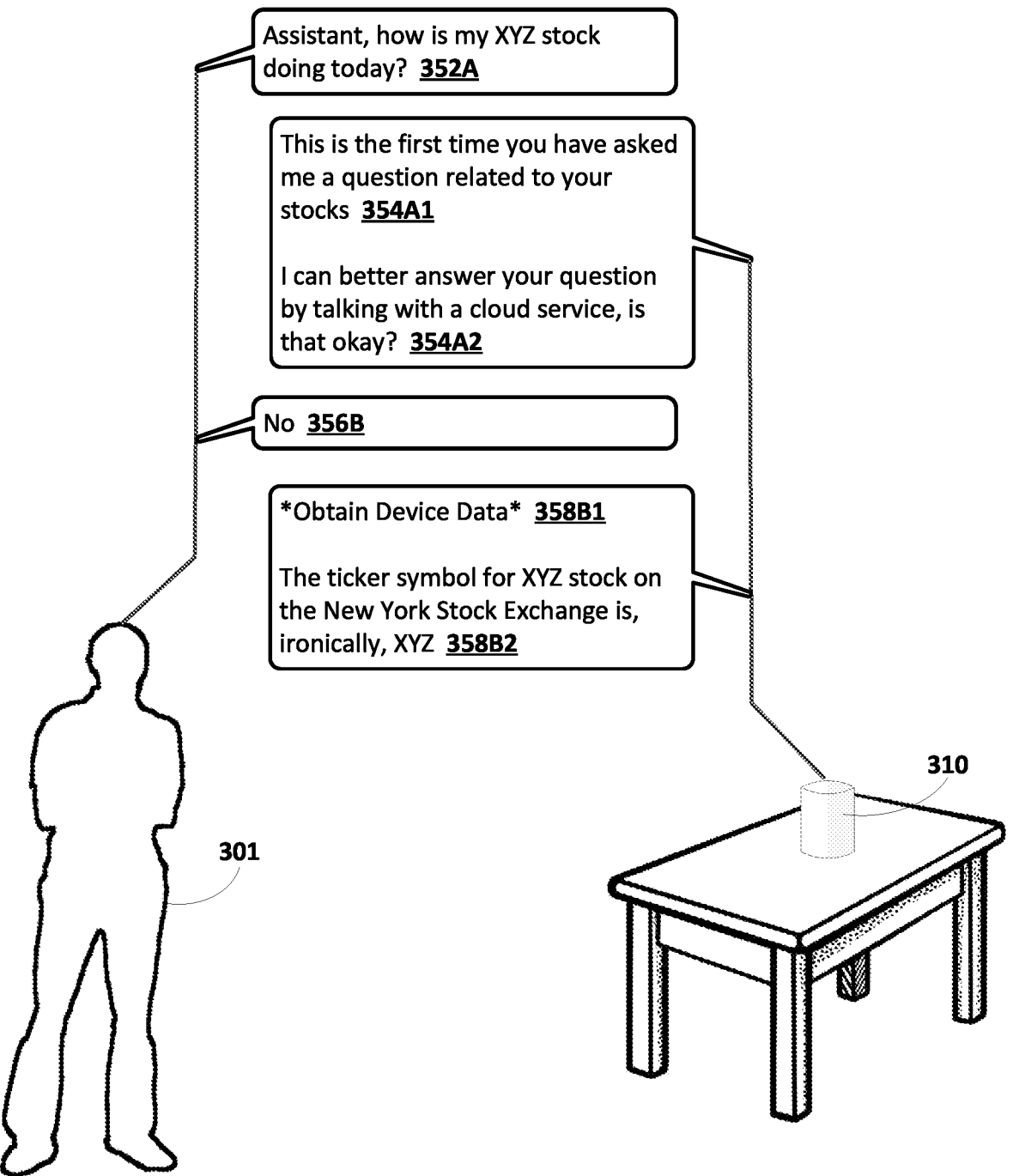
Figure 5A:
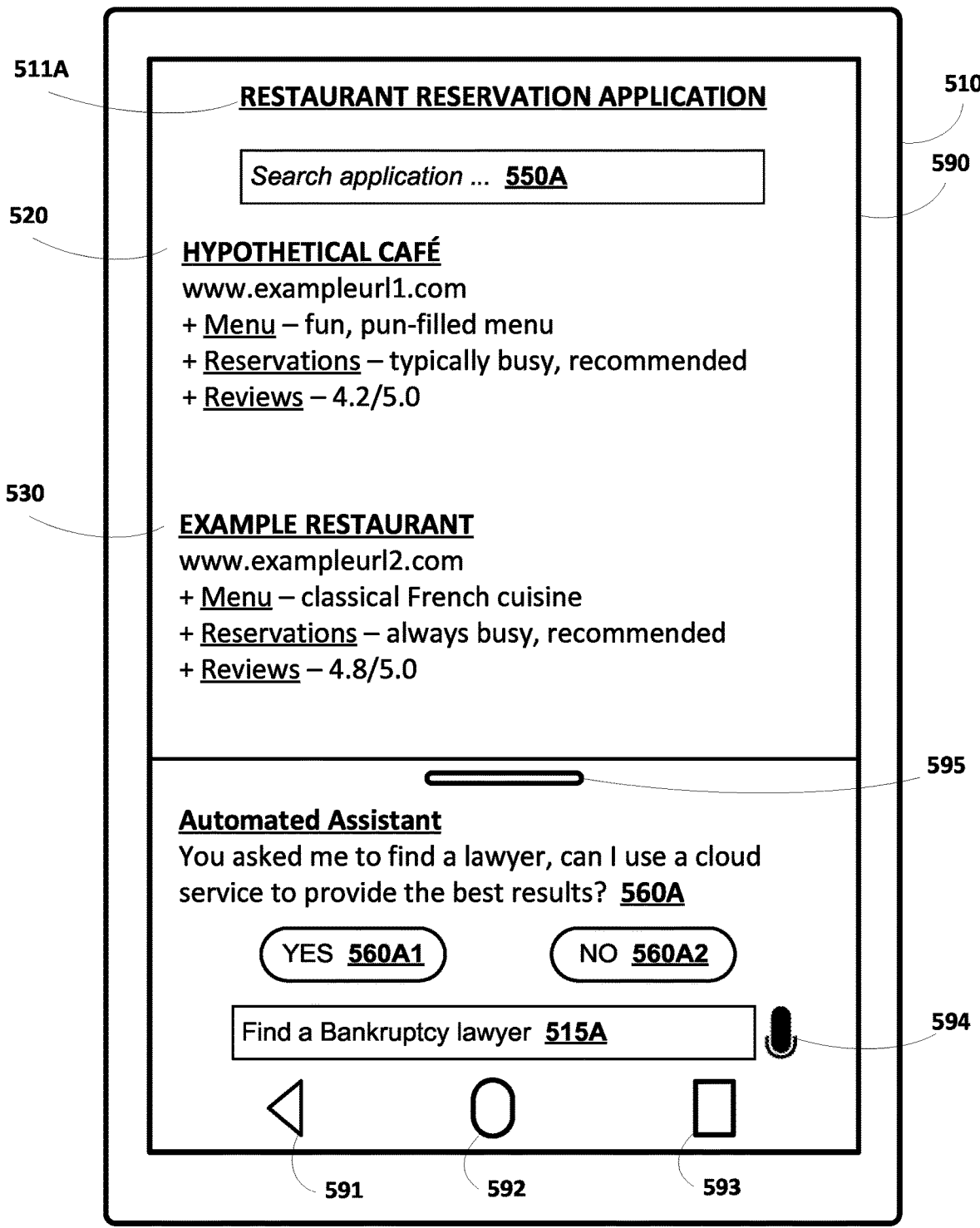
FIGS. 5A and 5B depict various non-limiting examples of determining whether to transmit a request to a third-party application to obtain third-party application data utilized in performance of certain fulfillment of an assistant command, in accordance with various implementations.
Figure 5B:
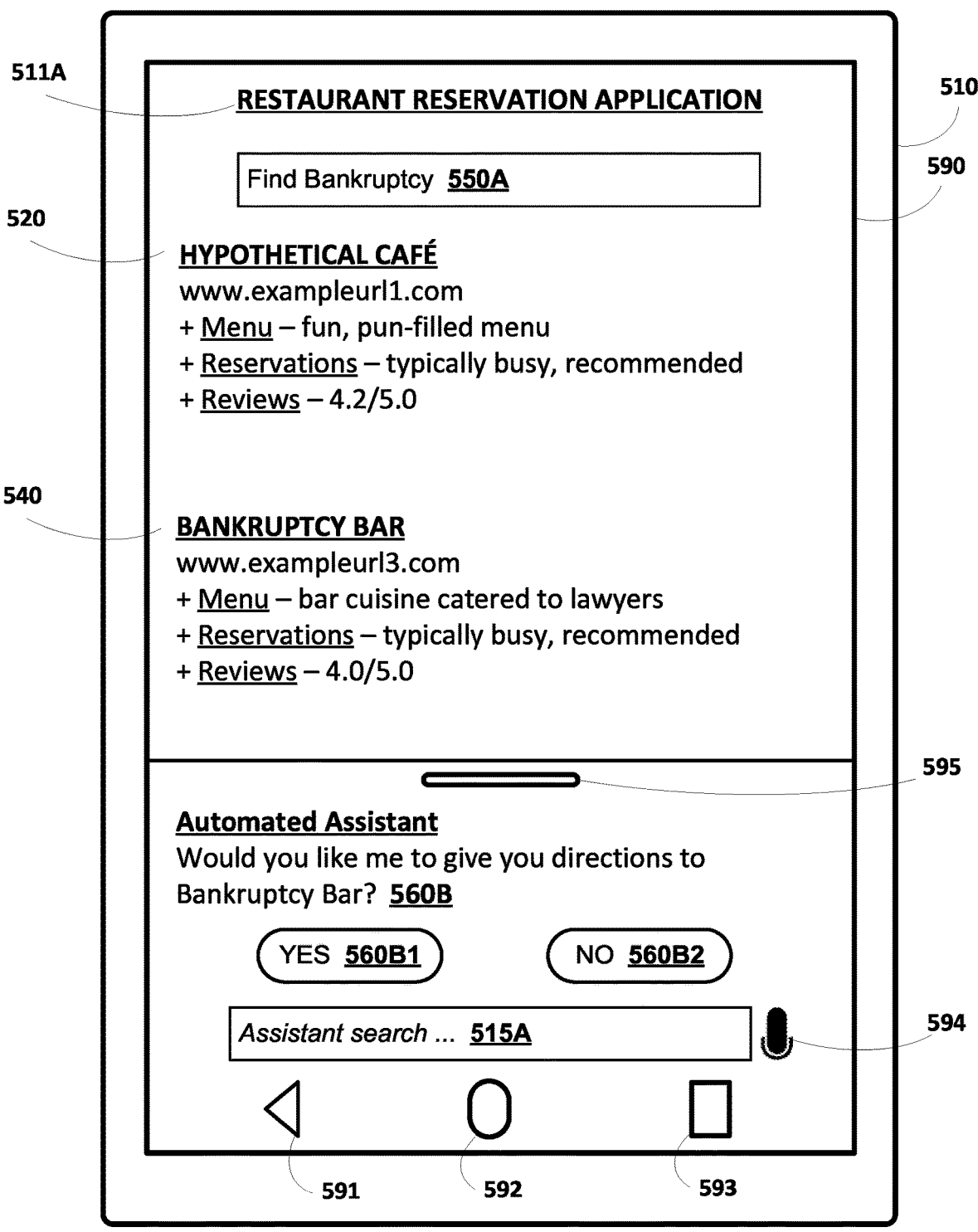
Figure 7A:
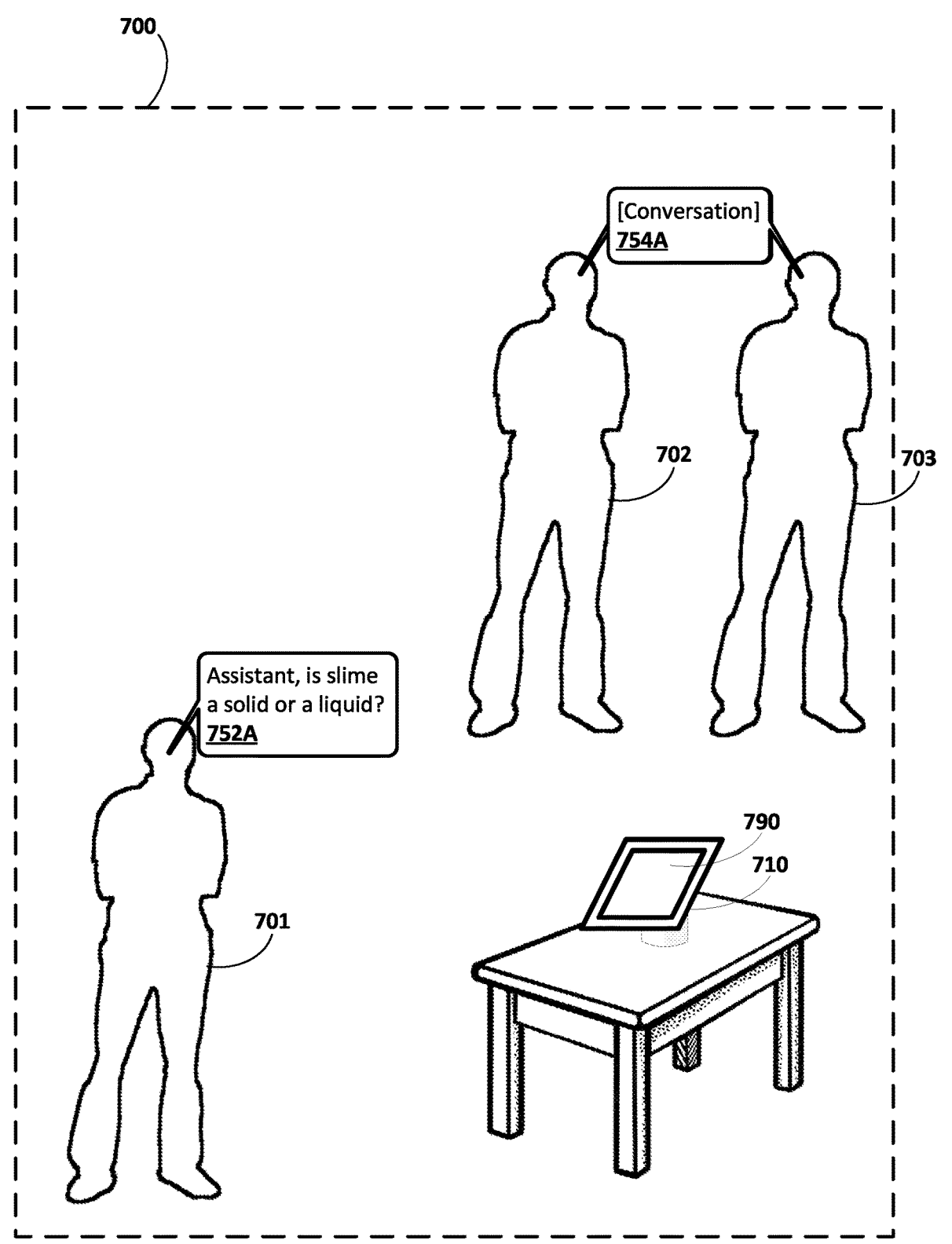
FIGS. 7A and 7B depict various non-limiting examples of determining whether to transmit a request to a server or third-party application to obtain data utilized in performance of certain fulfillment of an assistant command based on ambient noise(s), in accordance with various implementations.
Figure 7B:
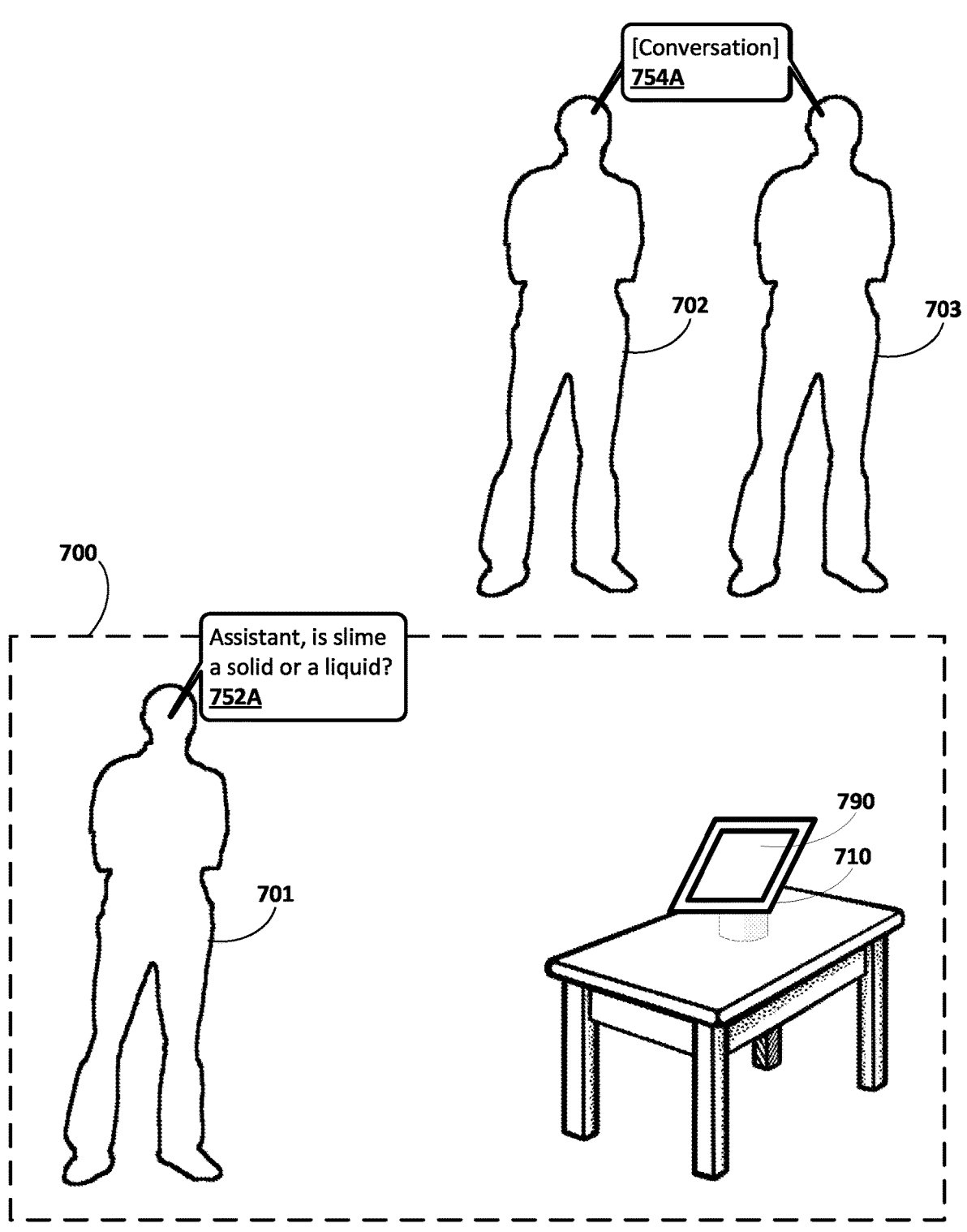

Turning now to FIGS. 3A and 3B, various non-limiting examples of determining whether to transmit a request to a server to obtain server data utilized in performance of certain fulfillment of an assistant command are depicted. An automated assistant executing locally at client device 310 (e.g., an instance of the client device 110 of FIG. 1) can perform one or more operations described herein, such as the operations of the method 200 of FIG. 2. Although the client device 310 depicted in FIGS. 3A and 3B is a standalone interactive speaker having microphone(s) and speaker(s), it should be understood that is for the sake of example and is not meant to be limiting. For example, the client device 310 can additionally or alternatively be a mobile device as depicted in FIGS. 5A and 5B, standalone interactive speaker having a display as depicted in FIGS. 7A and 7B, an in-vehicle client device or system, a desktop computer, a laptop, and/or any other client device.

Referring specifically to FIG. 3A, assume a user 301 provides a spoken utterance 352A of "Assistant, how is my XYZ stock doing today?" that is directed to the automated assistant. Audio data capturing the spoken utterance can be detected by microphone(s) of the client device 310, and can be processed, using an on-device ASR model, to generate recognized text corresponding to the spoken utterance 352A. In some implementations, the audio data may be processed using the on-device ASR model in response to determining the automated assistant has been invoked (e.g., by a particular word or phrase (e.g., "Assistant", "Hey Assistant", etc.), by a hardware or software button press, and/or by other means). Further, the recognized text corresponding to the spoken utterance 352A can be processed, using on-device NLP model(s), to generate annotations for the recognized text and/or to determine an intent of the user 301 in providing the spoken utterance 352A. For example, further assume that the automated assistant determines an intent of a stock inquiry based on output generated using the NLP model(s), determines slot values of XYZ stock for a stock parameter and a current for a stock price parameter, and determines a given category of the assistant command included the spoken utterance is a general search query category, or a more particularly, a pecuniary information category. In this example, the automated assistant can determine that server data is needed to perform the certain fulfillment of providing the user 301 a stock update responsive to the stock inquiry because the automated assistant has to transmit a request to a server to obtain responsive content for the spoken utterance 352A and to obtain a current stock price of XYZ stock (e.g., to determine a current value of the user's XYZ stock).

Moreover, assume that the automated assistant determines that the pecuniary information category associated with the assistant command included in the spoken utterance 352A corresponds to one or more particular categories that trigger the automated assistant to request consent, from the user 301, for transmitting the request to the server. In some implementations, the automated assistant can determine that the pecuniary information category corresponds to one or more of the particular categories based on one or more rules. The one or more rules can include, for example, user-defined rule(s), default rule(s), inferred rule(s), and/or other rule(s). For example, the user 301 may have previously defined a rule that indicates the user 301 should be prompted to provide consent for transmitting requests away from the client device 310 when an assistant command associated with obtaining pecuniary information is identified. As another example, a default rule may indicate that the user 301 should be prompted to provide consent for transmitting requests away from the client device 310 when an assistant command associated with obtaining pecuniary information is identified. As yet another example, an inferred rule may be inferred that the user 301 should be prompted to provide consent for transmitting requests away from the client device 310 when an assistant command associated with obtaining pecuniary information is identified based on the user 301 previously restricting access to the pecuniary information (e.g., password protected information, previously cancelled other requests for obtaining pecuniary information, etc.). Although particular rules are described herein, it should be understood that is for the sake of example and is not meant to be limiting. In additional or alternative implementations, an indication of the given category can be processed, using ML model(s), to determine that it corresponds to one or more particular categories (e.g., described with respect to the category engine 130 of FIG. 1).

In response to determining that the given category corresponds to one or more of the particular categories, the automated assistant can generate a prompt 354A2 of "I can better answer your question by talking with a cloud service, is that okay?", and cause the prompt to be provided for presentation to the user 301 via speaker(s) of the client device 310. Notably, the prompt 354A2 is requesting that the user 301 consent to transmitting a request to the server to obtain the responsive content to perform the certain fulfillment with respect to the XYZ stock. In some implementation, additional information 354A1 may be provided for presentation to the user 301 along with the prompt 354A2. As depicted in FIG. 3A, the additional information 354A1 can include an indication of the given category that triggered the prompt 354A2, such as "This is the first time you have asked me a question related to your stocks". Accordingly, the automated assistant can notify the user 301 that data needs to be transmitted away from the client device 310 to perform the certain fulfillment of the assistant command, and can request that the user 301 consent to the transmitting of the data away from the client device 310.

Further assume that the user 301 provides an additional spoken utterance 356A of "Yes" that consents to transmitting the request to the server to obtain the responsive content. In this example, the automated assistant can generate a request for the server data as indicated by 358A1, transmit the request for the server data to the server as indicated by 358A2, and receive the server data to perform the certain fulfillment of the assistant command as indicated by 358A3. The automated assistant can then cause responsive content 358A4 of "XYZ stock is up to $150 per share, which is a 2.5% increase" and responsive content 385A5 of "Your XYZ stock now totals $900" to be provided for presentation to the user 301 via the speaker(s) of the client device 310. In some implementations, and even though the user 301 requested to transmit the request to the server, the request can be transmitted along with an indication that the request (and any data transmitted along with the request, e.g., the audio data capturing the spoken utterance 352A) cannot be stored (e.g., non-transiently) at the server. In these and other manners, the automated assistant can perform the certain fulfillment of the assistant command while also ensuring data of the user 301 is secure and private if the user 301 indicates a desire for data to be transmitted away from the device 301 by including an indication that it may not persist anywhere aside from the client device 310 itself. In some implementations, if the user 301 subsequently provides another spoken utterance that includes an assistant command that is determined to belong to the pecuniary information category, the automated assistant may not prompt the user 301 for consent since the user 301 previously consented to transmitting the request to the server. In other words, the automated assistant can generate an inferred rule, based on the user 301 consenting to transmitting of the request, that assistant commands associated with the pecuniary information category can be transmitted to the server without prompting the user 301 for consent.

In contrast, and referring specifically to FIG. 3B, further assume that the user provides an additional spoken utterance 356B of "No" that does not consent to transmitting the request to the server to obtain the response content. In this example, the automated assistant can obtain device data as indicated by 358B1 to perform alternate fulfillment of the assistant command. The device data can include, for example, pre-cached content (e.g., obtained using the pre-cache engine 160 of FIG. 1) associated with the pecuniary information category and/or any other content that is locally available to the client device 310. For example, responsive content 358B2 of "The ticker symbol for XYZ stock on the New York Stock Exchange is, ironically, XYZ" can be provided for presentation to the user 301 via the speaker(s) of the client device 310. The responsive content 358B2 can be considered alternate fulfillment of the assistant command because it is not the desired content of the user 301, but it is still relevant to the assistant command (e.g., information about XYZ stock). In some implementations, if the user 301 subsequently provides another spoken utterance that includes an assistant command that is determined to belong to the pecuniary information category, the automated assistant may not prompt the user 301 for consent since the user 301 previously did not consent to transmitting the request to the server. In other words, the automated assistant can generate an inferred rule, based on the user 301 not consenting to transmitting of the request, that assistant commands associated with the pecuniary information category cannot be transmitted to the server. As a result, the automated assistant may prompt the user 301 for consent or obtain additional device data to provide responsive content to the subsequent spoken utterance.

Although FIGS. 3A and 3B are described herein with respect to transmitting a single request to the server to obtain the server data to perform the certain fulfillment, it should be understood that is for the sake of example and is not meant to be limiting. For example, to perform the certain fulfillment data, multiple requests may need to be transmitted to various servers and/or third-party applications. For example, a first request may be transmitted to a third-party application accessible by the client device 310 to identify pecuniary information of a user with respect to XYZ stock, and a second request may be transmitted to a third-party server to determine a current stock price of XYZ stock. In this example, the user may be prompted to consent to transmitting of requests to each of the servers and/or third-party applications needed to obtain the responsive content. Accordingly, the user 301 may be notified when certain data that is generated locally on the client device 310 may be transmitted away from the client device 310, and provided with an opportunity to prevent transmitting this certain data away from the client device 310. Further, even if the user 301 does consent to transmitting the certain data away from the client device 310, the certain data can be transmitted along with an indication that the certain data cannot be stored anywhere that it is transmitted.

Moreover, although FIGS. 3A and 3B are described with respect to the user 301 simply providing consent (e.g., the spoken utterance 356A of "Yes" in FIG. 3A) and denying consent (e.g., the spoken utterance 356B of "No" in FIG. 3B), it should be understood that is for the sake of example and is not meant to be limiting. For example, the user 301 can further define an extent to which the consent extends. For instance, assume the spoken utterance providing consent in the example of FIG. 3A is "Yes, always transmit requests for stock inquiries to the server". In this instance, the user 301 has provided blanket consent to transmitting requests for stock inquiries and the user may not be prompted to provide consent in the future (until the user 301 indicates otherwise). Also, for instance, assume the spoken utterance providing consent in the example of FIG. 3A is "Yes, but just for this stock". In this instance, the user 301 has provided blanket consent to transmitting requests for stock inquiries for XYZ stock, but not other stocks, and the user 301 may not be prompted to provide consent in the future for stock inquiries about XYZ stock, but will be prompted to provide consent for other stocks. Accordingly, not only can the user 301 provide or deny consent, but the user 301 can also provide varying degrees of consent.

Figure 4:
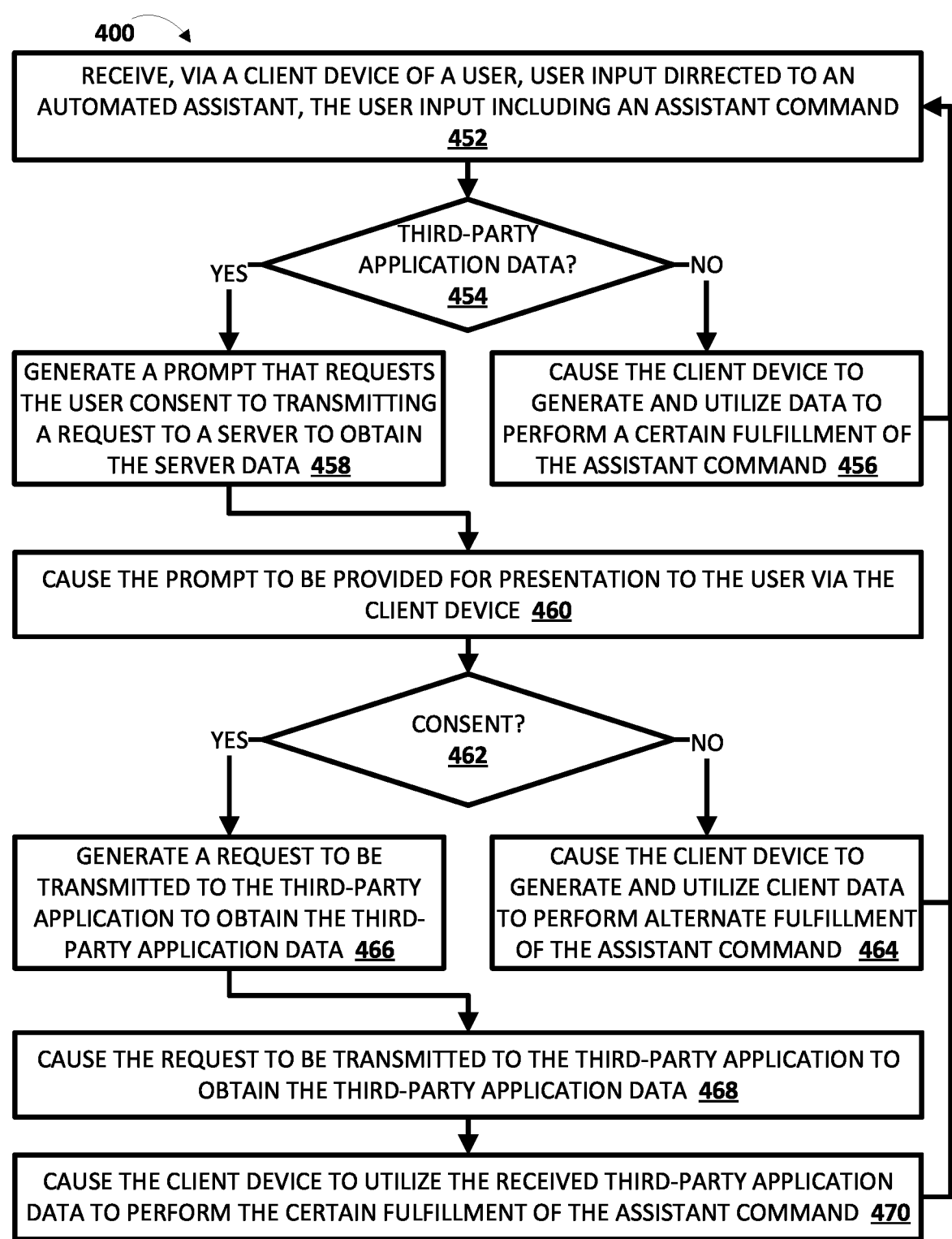
FIG. 4 depicts a flowchart illustrating an example method of determining whether to transmit a request to a third-party application to obtain third-party application data utilized in performance of certain fulfillment of an assistant command, in accordance with various implementations.

Turning now to FIG. 4, a flowchart illustrating an example method 400 of determining whether to transmit a request to a third-party application to obtain third-party application data utilized in performance of certain fulfillment of an assistant command is depicted. For convenience, the operations of the method 400 are described with reference to a system that performs the operations. This system of the method 400 includes one or more processors and/or other component(s) of computing device(s) (e.g., client device 110 of FIG. 1, client device 310 of FIGS. 3A and 3B, client device 410 of FIGS. 5A and 5B, client device 710 of FIGS. 7A and 7B, and/or computing device 810 of FIG. 8, one or more servers, and/or other computing devices). Moreover, while operations of the method 400 are shown in a particular order, this is not meant to be limiting. One or more operations may be reordered, omitted, and/or added.

At block 452, the system receives, via a client device of a user, user input directed to an automated assistant, the user input including an assistant command. In some implementations, the user input can be spoken input captured in audio data generated by microphone(s) of the client device, while in additional or alternative implementations, the user input can be typed input detected via an input device of the client device.

At block 454, the system determines whether third-party application data is needed to perform a certain fulfillment of the assistant command. In other words, the system determines whether a request needs to be transmitted to the third-party application (e.g., accessible by the client device) to obtain responsive content to the assistant command included in the user input. The system can determine whether the request needs to be transmitted to the third-party application based on, for example, a type of fulfillment data indicating that third-party application data is needed to perform the certain fulfillment of the assistant command, capabilities of various third-party applications accessible by the client device, one or more contextual signals associated with third-party applications executing on the client device, and/or other criteria. In some implementations, the system may only determine whether third-party application data is needed to perform the certain fulfillment of the assistant command in response to determining a given category of the assistant command corresponds to one or more particular categories.

If, at an iteration of block 454, the system determines the third-party application data is not needed to perform the certain fulfillment of the assistant command, the system proceeds to block 456. At block 456, the system causes the client device to generate and utilize data to perform a certain fulfillment of the assistant command. For example, if user input includes an assistant command to set a timer, set a reminder, and/or any other assistant command that can be performed locally at the client device, then the system can generate and utilize client data to perform the certain fulfillment of setting the timer, setting the reminder, etc. As another example, if user input includes an assistant command that is directed to a server, then the system can utilize techniques described herein with respect to FIG. 2 to obtain server data. The system returns to block 452 and performs a subsequent iteration of the method 400 when additional user input directed to the automated assistant is received via the client device of the user.

If, at an iteration of block 454, the system determines the third-party application data is needed to perform the certain fulfillment of the assistant command, the system proceeds to block 458. At block 458, the system generates a prompt that requests the user consent to transmitting a request to a server to obtain the server data. At block 460, the system causes the prompt to be provided for presentation to the user via the client device. For example, assume user input includes an assistant command to inquire about a bank account balance, and assume a bank application installed on the client device of the user can provide responsive content to the user's inquiry. In this example, the system can generate a prompt that indicates an automated assistant needs to transmit a request to the bank application to perform certain fulfillment (e.g., obtain responsive content to the inquiry), and that requests the user consent to transmitting of the search query to the bank account application.

At block 462, the system determines whether additional user input is received that consents to transmitting the request to the third-party application to obtain the third-party application data. If, at an iteration of block 462, the system determines that no additional user input has been received or that additional input has been received that does not consent to the transmitting of the request, the system proceeds to block 464. At block 464, the system causes the client device to generate and utilize client data to perform an alternate fulfillment of the assistant command. The system returns to block 452 and performs a subsequent iteration of the method 400 when additional user input directed to the automated assistant is received via the client device of the user. If, at an iteration of block 462, the system determines that additional user input that consents to the transmitting of the request, the system proceeds to block 466. At block 466, the system generates a request to be transmitted to the third-party application to obtain the third-party application data. At block 468, the system causes the request to be transmitted to the third-party application to obtain the third-party application data. At block 470, the system causes the client device to utilize the received third-party application data to perform the certain fulfillment of the assistant command. Blocks 462-470 of FIG. 4 can be performed in the same or similar manner as blocks 266-274 of FIG. 2, but with respect to a third-party application and third-party application data.

Although FIG. 4 is described herein with respect to transmitting requests to third-party application(s) to obtain third-party application data responsive to user input that includes the assistant command, it should be understood that is for the sake of example and is not meant to be limiting. For example, the techniques described with respect to FIG. 4 can be utilized in scenarios where the assistant command indicates the third-party application should perform an action responsive to the assistant command. For instance, in implementations where a third-party navigation application (and/or a corresponding third-party server) is utilized to provide directions to a particular address, the user can be prompted to consent to transmitting of a request that includes an address prior to transmitting any requests to the third-party navigation application (and/or the corresponding third-party server).

Turning now to FIGS. 5A and 5B, various non-limiting examples of determining whether to transmit a request to a third-party application to obtain third-party application data utilized in performance of certain fulfillment of an assistant command are depicted. An automated assistant executing locally at client device 510 (e.g., an instance of the client device 110 of FIG. 1) can perform one or more operations described herein, such as the operations of the method 400 of FIG. 4. Although the client device 510 depicted in FIGS. 5A and 5B is a mobile device, it should be understood that is for the sake of example and is not meant to be limiting. For example, the client device 510 can additionally or alternatively be a standalone interactive speaker as depicted in FIGS. 3A and 3B, standalone interactive speaker having a display as depicted in FIGS. 7A and 7B, an in-vehicle client device or system, a desktop computer, a laptop, and/or any other client device.

The client device 510 depicted in FIGS. 5A and 5B may include various user interface components including, for example, microphone(s) to generate audio data based on spoken utterances and/or other audible input, speaker(s) to audibly render synthesized speech and/or other audible output, and a display 590 to receive touch input and/or to visually render transcriptions and/or other visual output. Further, the display 590 of the client device 510 includes various system interface elements 591, 592, and 593 (e.g., hardware and/or software interface elements) that may be interacted with by a user (e.g., the user 301 of FIGS. 3A and 3B) to cause the client device 510 to perform one or more actions. The display 590 of the client device 510 enables the user to interact with content rendered on the display 590 by touch input (e.g., by directing user input to the display 590 or portions thereof) and/or by spoken input (e.g., by selecting microphone interface element 594—or just by speaking without necessarily selecting the microphone interface element 594 (i.e., the automated assistant may monitor for one or more terms or phrases, gesture(s) gaze(s), mouth movement(s), lip movement(s), and/or other conditions to activate spoken input) at the client device 510).

For example, and referring specifically to FIG. 5A, assume a user of the client device 510 is interacting with a restaurant reservation application (e.g., a third-party application accessible by the client device 510) as indicated by 511A. Further assume the user is viewing restaurants Hypothetical Café as indicated by 520 and Example Restaurant as indicated by 530. Further assume the user of the client device 510 provides a spoken utterance of "Find a bankruptcy lawyer" while viewing the restaurants. In this example, the automated assistant may determine whether the spoken utterance includes an assistant command directed to the automated assistant or whether the spoken utterance is directed to the restaurant reservation application. In some implementations, the automated assistant can determine capabilities of third-party applications to determine whether a spoken utterance is directed to the automated assistant or one or more third-party applications. For example, various third-applications may publish a corresponding list of capabilities to the automated assistant and the automated assistant can maintain the corresponding lists of capabilities of the various third-party applications, the automated assistant can analyze content currently being displayed by a given third-party application in a foreground of the client device 510 to determine capabilities of the given third-party application, the automated assistant can determine whether an assistant command includes an expected assistant command that can be handled by one or more third-party applications, and so on.

For example, search field 515A depicted in FIG. 5A is a search field associated with the automated assistant performing a search, whereas search field 550A is a search field associated with the restaurant reservation application for performing searches for restaurants, cuisine types, and/or other content that is accessible via the restaurant reservation application. In the example of FIG. 5A, and as noted above, the spoken utterance may be "Find a bankruptcy lawyer". Based on processing the spoken utterance, the automated assistant may determine the spoken utterance includes an assistant command directed to the automated assistant. For instance, the automated assistant can determine the spoken utterance is directed to the automated assistant, and not the third-party application, based on the spoken utterance being a search query corresponding to a legal services category, based on the restaurant reservation application not being capable of handling search queries included in the legal services category or not expecting a search query belonging to the legal services category, and/or any other technique described herein. The search field 515A can optionally include a transcription of the spoken utterance in response to determining that the spoken utterance is directed to the automated assistant.

Moreover, assuming that the legal services category for the assistant command corresponds to one or more particular categories, the automated assistant can generate and present a prompt 560A of "You asked me to find a lawyer, can I use a cloud service to provide the best results?" for presentation to the user (e.g., audibly as described with respect to FIGS. 3A and 3B and/or visually as depicted in FIG. 5A) that requests the user consent to transmitting the request to a server (or third-party application associated with obtaining legal services). Further, one or more corresponding selectable elements may be visually rendered along with the prompt 560A. For example, a first selectable element 560A1 of "Yes" can be rendered along with the prompt 560A and that, when selected, causes the automated assistant to generate a request to be transmitted to the server to obtain server data as responsive content to the spoken utterance. Further, a second selectable element 560A2 of "No" can also be rendered along with the prompt 560A and that, when selected, causes the automated assistant to generate device data as responsive content to the spoken utterance. The user can also dismiss the prompt 560A without responding by interacting with element 595.

In contrast, and referring specifically to FIG. 5B, assume the spoken utterance is simply "Find Bankruptcy". Based on processing the spoken utterance, the automated assistant may determine the spoken utterance includes an assistant command directed to the third-party application. For instance, the automated assistant can determine the spoken utterance is directed to the automated assistant, and not the third-party application, based on the spoken utterance being a search query that includes an apparent entity of "Bankruptcy", based on the restaurant reservation application being capable of handling search queries that include entities, and/or any other technique described herein. Accordingly, the automated assistant can cause the restaurant reservation application to present a search result 540 that indicates there is a local fictitious bar named Bankruptcy Bar. The search field 550A can optionally include a transcription of the spoken utterance in response to determining that the spoken utterance is directed to the third-party application and not the automated assistant.

Although the spoken utterance is not directed to the automated assistant, the automated assistant may still generate and present a prompt to the user to further fulfill the spoken utterance. For example, the automated assistant may generate a prompt 560B of "Would you like me to give you directions to Bankruptcy Bar?" for presentation to the user (e.g., audibly as described with respect to FIGS. 3A and 3B and/or visually as depicted in FIG. 5A) that offers navigational directions to be presented to the user through selection of one or more of corresponding graphical elements 560B1 and/or 560B2. Notably, in obtaining the search result 540, the automated assistant can still include an indication that any audio data capturing the spoken utterance cannot be stored (e.g., non-transiently) remotely by the restaurant reservation application to ensure any user data transmitted away from the client device 510 is secure.

Moreover, although FIGS. 5A and 5B are described with respect to the user simply providing or denying consent (e.g., via the corresponding graphical elements 560A1 and 560A2 in FIG. 5A and/or the corresponding graphical elements 560B1 and 560B2 in FIG. 5B), it should be understood that is for the sake of example and is not meant to be limiting. For example, the user can further define an extent to which the consent extends via other corresponding graphical elements that are not depicted and/or via other user input. For instance, one or more additional corresponding graphical elements associated with varying degrees of consent can be provided for presentation to the user. Accordingly, not only can the user provide or deny consent for a particular request, but the user can also provide varying degrees of consent that can be utilized in determining whether and/or when to prompt the user when future assistant commands having the same category are identified.

Turning now to FIG. 6, a flowchart illustrating an example method 600 of determining whether to transmit a request to a server or third-party application to obtain data utilized in performance of certain fulfillment of an assistant command based on ambient noise(s) is depicted. For convenience, the operations of the method 600 are described with reference to a system that performs the operations. This system of the method 600 includes one or more processors and/or other component(s) of computing device(s) (e.g., client device 110 of FIG. 1, client device 310 of FIGS. 3A and 3B, client device 410 of FIGS. 5A and 5B, client device 710 of FIGS. 7A and 7B, and/or computing device 810 of FIG. 8, one or more servers, and/or other computing devices). Moreover, while operations of the method 600 are shown in a particular order, this is not meant to be limiting. One or more operations may be reordered, omitted, and/or added.

At block 652, the system receives, via one or more microphones of a client device of a user, audio data capturing a spoken utterance directed to an automated assistant. At block 654, the system processes, using an on-device ASR model stored locally on the client device, the audio data to identify an assistant command included in the spoken utterance. In some implementations, the system can identify the assistant command directly based on output generated using the on-device ASR model. In other implementations, the system can process, using on-device NLP model(s), the output generated using the on-device ASR model to generate one or more annotations, and the system can identify the assistant command based on the annotations (and optionally a given category associated with the assistant command based on the annotations).

At block 656, the system processes, using an on-device ambient noise model stored locally on the client device, the audio data to determine a given category associated with ambient noise captured in the audio data, the given category being one of a plurality of disparate categories defined with varying degrees of granularity. The on-device ambient noise model can be trained to classify ambient noise captured in the audio data that includes the spoken utterance. For example, the ambient noise may correspond to a conversation category (e.g., other users conversing in a background when the user provides the spoken utterance), a multimedia category (e.g., music, television, and/or other media playing in the background), and/or other categories associated with the ambient noise. In implementations where the ambient noise is classified into the conversation category, the audio data can additionally or alternatively be processed, using one or more voice identification models, to identify the other users that are conversing if speaker embeddings are available.

At block 658, the system determines whether the given category associated with the ambient noise corresponds to one or more particular categories. In some implementations, the system can utilize one or more rules to determine whether the given category corresponds to one or more of the particular categories. The one or more rules can include, for example, user-defined rule(s), default rule(s), inferred rule(s), and/or other rules. For example, one or more of these rules may indicate that if a voice of the user of the client device is ever captured in ambient noise when an assistant command is received (e.g., the user is in the environment of the client device, but is not the user that provided the spoken utterance), then audio data that captures that spoken utterance cannot be transmitted from the client device to any servers or third-party applications. As another example, one or more of these rules may indicate that if ambient noise captures music or other media when an assistant command is received (e.g., the user is in the environment of the client device, but is not the user that provided the spoken utterance), then audio data that captures that spoken utterance can always be transmitted from the client device to any servers or third-party applications.

If, at an iteration of block 658, the system determines the given category does not correspond to one or more of the particular categories, the system proceeds to block 660. At block 660, the system causes the client device to obtain and utilize data from a server (e.g., hosting the third-party application) or the third-party application to perform certain fulfillment of the assistant command. For example, the system may also implement one or more of the operations of the method 200 of FIG. 2 and/or the method 400 of FIG. 4 to obtain the server data or the third-party application data to perform the certain fulfillment of the assistant command (and optionally client data if it is determined not to transmit a request to the server or the third-party application). For instance, if the system determines the given category associated with the ambient noise corresponds to one or more of the particular categories, the system may implement one or more of the operations of the method 200 of FIG. 2 and/or the method 400 of FIG. 4 to determine whether server data and/or third-party application data is needed to perform the certain fulfillment. If so, the system can include an indication that the audio data also captures the ambient conversation. However, if the system determines that no server data and/or third-party application data is needed (e.g., the certain fulfillment can be performed locally via the client device), then the user may not be prompted at all. The system returns to block 652 and performs a subsequent iteration of the method 600 when additional user input directed to the automated assistant is received via the client device of the user.

If, at an iteration of block 658, the system determines the given category does correspond to one or more of the particular categories, the system proceeds to block 662. At block 662, the system generates a request to be transmitted to a server or third-party application to obtain data to perform certain fulfillment of the assistant command. At block 664, the system causes the request to be transmitted to the server or the third-party application to obtain the data, the request being transmitted along with an indication that any audio data transmitted to the server or the third-party application cannot be stored (e.g., non-transiently) by the server or the third-party application. At block 666, the system causes the client device to utilize the received data to perform the certain fulfillment of the assistant command. Blocks 662-666 of FIG. 6 can be performed in the same or similar manner as blocks 270-274 of FIG. 2.

Although the operations of the method 600 depicted in FIG. 6 do include prompting the user, it should be understood that is for the sake of clarity and is not meant to be limiting. For example, an iteration of the method 600 of FIG. 6 can include an iteration of aspects of the method 200 of FIG. 2 and/or the method 400 of FIG. 4. For example, the system can prompt the user to consent to transmitting of a request to the server or the third-party application, and determine whether to transmit the request to the server or the third-party application based on further user input received responsive to the prompt.

Turning now to FIGS. 7A and 7B, various non-limiting examples of determining whether to transmit a request to a server or third-party application to obtain data utilized in performance of certain fulfillment of an assistant command based on ambient noise(s) are depicted. An automated assistant executing locally at client device 710 (e.g., an instance of the client device 110 of FIG. 1) can perform one or more operations described herein, such as the operations of the method 600 of FIG. 6. Although the client device 710 depicted in FIGS. 7A and 7B is a standalone interactive speaker having a display, it should be understood that is for the sake of example and is not meant to be limiting. For example, the client device 710 can additionally or alternatively be a standalone interactive speaker as depicted in FIGS. 3A and 3B, a mobile device as depicted in FIGS. 5A and 5B, an in-vehicle client device or system, a desktop computer, a laptop, and/or any other client device.

For example, and referring specifically to FIG. 7A, assume a user 701 provides a spoken utterance 752A of "Assistant, is slime a liquid or solid?" that is directed to the automated assistant while in an environment 700 encompassed by the dashed line. Audio data capturing the spoken utterance can be detected by microphone(s) of the client device 710, and can be processed, using an on-device ASR model, to generate recognized text corresponding to the spoken utterance 752A. In some implementations, the audio data may be processed using the on-device ASR model in response to determining the automated assistant has been invoked (e.g., by a particular word or phrase (e.g., "Assistant", "Hey Assistant", etc.), by a hardware or software button press, and/or by other means). Further, the recognized text corresponding to the spoken utterance 752A can be processed, using on-device NLP model(s), to generate annotations for the recognized text and/or to determine an intent of the user 701 in providing the spoken utterance 752A. For example, further assume that the automated assistant determines an intent of a search query based on output generated using the NLP model(s), determines slot values of slime for an entity parameter and liquid or solid for a state parameter, and determines a given category of the assistant command included the spoken utterance is a general search query category, or a more particularly, a science category. In this example, the automated assistant can determine that server data is needed to perform the certain fulfillment of providing the user 701 an answer responsive to the search query because the automated assistant has to transmit a request to a server to obtain responsive content for the spoken utterance 752A.

Moreover, assume that the automated assistant determines that the science category associated with the assistant command included in the spoken utterance 752A does not correspond to one or more particular categories that trigger the automated assistant to request consent, from the user 701, for transmitting the request to the server. However, and as depicted in the environment 700 of FIG. 7A, assume that a first additional user 702 and a second additional user 703 are also in the environment 700 having a conversation as indicated by 754A when the spoken utterance 752A is received. In some implementations, the automated assistant can additionally or alternatively process the audio data capturing the spoken utterance 752A to determine a given category associated with ambient noise that is also captured in the audio data. For example, the automated assistant can process, using ambient noise model(s), the audio data capturing the spoken utterance 752A to determine a conversation category based on the first additional user 702 and the second additional user 703 are also in the environment 700 having the conversation as indicated by 754A. Further, in implementations where speaker embeddings are available to the client device 710, the automated assistant can determine whether the first additional user 702 and the second additional user 703 correspond to users that are known to the automated assistant using voice identification model(s) and the speaker embeddings (e.g., parents of the user 701, siblings of the user 701, etc.).

Further, the automated assistant can determine that the conversation category corresponds to one or more of the particular categories based on one or more rules. The one or more rules can include, for example, user-defined rule(s), default rule(s), inferred rule(s), and/or other rule(s). For example, the user 701 (or one of the additional users 702 or 703) may have previously defined a rule that indicates the user 701 should be prompted to provide consent for transmitting requests away from the client device 710 when audio data capturing an assistant command that also captures ambient conversation is identified such that one or more of the users 701, 702, or 703 is aware when ambient conversations are inadvertently captured in audio data. As another example, a default rule may indicate that any audio data that captures ambient conversations should be transmitted along with an indication that no audio data that captures an ambient conversation should persist away from the client device 710, or that only text corresponding to the assistant command should be transmitted to the server(s) and/or third-party application(s) without transmitting any of the audio data that captures the spoken utterance 752A. As yet another example, one or more of the rules may indicate that any audio data transmitted away from the client device 710 should be filtered to remove any ambient noises prior to being transmitted away from the client device 710. Although particular rules are described herein, it should be understood that is for the sake of example and is not meant to be limiting. In some implementations, the automated assistant may only apply these rules if an identity of one of the additional users 702 or 703 is determined based on processing the audio data using the voice identification model(s) and the speaker embeddings.

In response to determining that the given category corresponds to one or more of the particular categories, the automated assistant can generate a prompt (not depicted) of "I captured some ambient conversation along with your utterance, is it okay if I still transmit the request?" and cause the prompt to be provided for presentation to the user 301 via speaker(s) of the client device 710 and/or a display 790 of the client device 710. Notably, even if the user consents to transmitting of the request, the request may be transmitted along with an indication that the audio data cannot persist anywhere off the client device 710 (e.g., at a server or third-party application that generates responsive content to the spoken utterance 752A). In these and other manners, the automated assistant can ensure data of not only the user 701 that provided the spoken utterance 752A is secure, but also data of additional users 702 and 703 that may inadvertently be captured by the microphone(s) of the client device 710.

In contrast, and referring specifically to FIG. 7B, further assume that the user provides the same spoken utterance 752A of "Assistant, is slime a liquid or solid?" that is directed to the automated assistant while in the environment 700 encompassed by the dashed line. However, in this example, assume the first additional user 702 and the second additional user 703 are not in the environment, such that the conversation 754A is not captured in the audio data that captures the spoken utterance 752A. In this example, there may be no ambient noise captured in the audio data, and the automated assistant can proceed to perform the certain fulfillment in accordance with techniques described herein (e.g., with respect to the method 200 of FIG. 2 and/or the method 400 of FIG. 4). Notably, the automated assistant may still process the audio data using the ambient noise model(s), but may determine that the ambient noise corresponds to a null category or another category based on other ambient noises that are present in the environment 700 when the spoken utterance is received.

Figure 8:
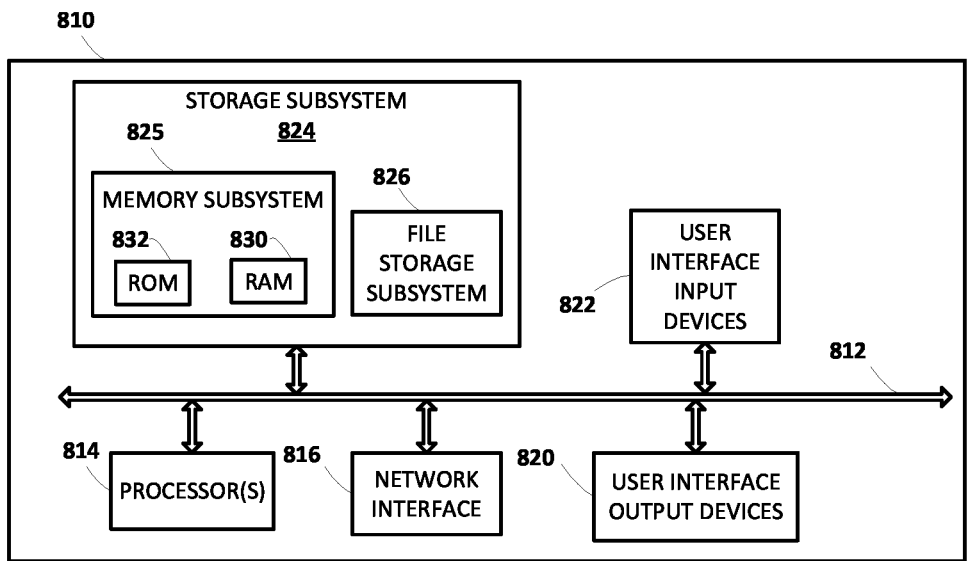
FIG. 8 depicts an example architecture of a computing device, in accordance with various implementations.

FIG. 8 is a block diagram of an example computing device 810 that may optionally be utilized to perform one or more aspects of techniques described herein. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, via a client device of a user, user input directed to an automated assistant, the user input including an assistant command; processing, locally at the client device of the user, the user input to determine a given category associated with the assistant command, the given category being one of a plurality of disparate categories; determining, based on the assistant command, whether server data is needed to perform a certain fulfillment of the assistant command; and in response to determining that server data is needed to perform the certain fulfillment of the assistant command: determining whether the given category associated with the assistant command corresponds to one or more particular categories; and in response to determining that the given category associated with the assistant command corresponds to one or more of the particular categories: generating, based on the given category associated with the assistant command, a prompt that requests the user consent to transmitting a request to a server; causing the prompt to be provided for presentation to the user via the client device; receiving, via the client device of the user, additional user input directed to the automated assistant, the additional user input being responsive to the prompt; and determining, based on the additional user input, whether to transmit the request to the server to fulfill the assistant command. The request to be transmitted to the server requests the server data that is needed to perform the certain fulfillment of the assistant command.

These and other implementations of technology disclosed herein can optionally include one or more of the following features.

In some implementations, the method can further include, in response to determining the additional user input does not consent to transmitting the request to the server to fulfill the assistant command: refraining from causing the request to be transmitted to the server to fulfill the assistant command; and causing the client device to generate client data in an attempt to perform the certain fulfillment of the assistant command.

In some versions of those implementations, the method can further include determining whether the certain fulfillment of the assistant command can be performed utilizing the client data; and in response to determining that the certain fulfillment of the assistant command cannot be performed utilizing the client data: generating a notification that indicates the certain fulfillment of the assistant command cannot be performed without the server data; and causing the notification to be provided for presentation to the user via the client device.

In some further versions of those implementations, the method can further include utilizing the client data to perform an alternate fulfillment of the assistant command, wherein the alternate fulfillment of the assistant command is performed in the attempt to perform the certain fulfillment of the assistant command.

In some additional or alternative versions of those further implementations, the method can further include, in response to determining that the certain fulfillment of the assistant command can be performed utilizing the client data: utilizing the client data to perform the certain fulfillment of the assistant command.

In some implementations, the method can further include, in response to determining the additional user input consents to transmitting the request to the server to fulfill the assistant command: causing the request to be transmitted to the server to obtain the server data to fulfill the assistant command.

In some implementations, the method can further include, in response to determining the given category associated with the assistant command does not correspond to one or more of the particular categories: causing the request to be transmitted to the server to obtain the server data to perform the certain fulfillment of the assistant command. In some versions of those implementations, determining the given category associated with the assistant command does not correspond to one or more of the particular categories can include determining the user previously consented to transmitting requests associated with the given category to the server.

In some implementations, the method can further include determining whether any previous user input directed to the automated assistant includes a previous assistant command that corresponds to the given category. Determining whether the server data is required to perform the certain fulfilment of the assistant command can be in response to determining no previous user input directed to the automated assistant includes a previous assistant command that corresponds to the given category.

In some implementations, the assistant command can be a third-party assistant command that is associated with a third-party, and the server data can be third-party server data that is associated with the third-party.

In some implementations, the assistant command can be a first-party assistant command that is associated with a first-party, and the server data can be first-party server data that is associated with the first-party.

In some implementations, causing the prompt to be provided for presentation to the user via the client device can include causing synthesized speech audio data that includes the prompt to be audibly rendered for presentation to the user via one or more speakers of the client device.

In some implementations, causing the prompt to be provided for presentation to the user via the client device can include causing the prompt and one or more corresponding selectable elements to be visually rendered for presentation to the user via a display of the client device.

In some implementations, determining whether the given category associated with the assistant command corresponds to one or more of the particular categories can include utilizing one or more rules to determine whether the given category associated with the assistant command corresponds to one or more of the particular categories. In some versions of those implementations, the one or more rules can include one or more of: one or more user-defined rules that indicate any assistant commands associated with the given category correspond to one or more of the particular categories; one or more default rules that indicate any assistant commands associated with the given category correspond to one or more of the particular categories; or one or more inferred rules that indicate prior assistant commands associated with the given category correspond to one or more of the particular categories.

In some implementations, processing the user input to determine the given category associated with the assistant command locally at the client device of the user can include processing, using an on-device assistant command classification model stored locally at the assistant device, the user input to determine the given category from among the plurality of disparate categories.

In some implementations, a method implemented by one or more processors is provided, and includes receiving, via a client device of a user, user input directed to an automated assistant, the user input including an assistant command; determining whether third-party application data is needed to perform a certain fulfillment of the assistant command, the third-party application data being associated with a third-party application that is accessible by the client device; and in response to determining that the third-party application data is needed to perform the certain fulfillment of the assistant command: generating a prompt that requests the user consent to transmitting a request to the third-party application; causing the prompt to be provided for presentation to the user via the client device; receiving, via the client device of the user, additional user input directed to the automated assistant, the additional user input being responsive to the prompt; and determining, based on the additional user input, whether to transmit the request to the third-party application to request the third-party application data. The request to be transmitted to the third-party application requests the third-party application data that is needed to perform the certain fulfillment of the assistant command.

These and other implementations of technology disclosed herein can optionally include one or more of the following features.

In some implementations, determining whether the third-party application data is needed to perform the certain fulfillment of the assistant command can include determining one or more capabilities of the third-party application based on the third-party application providing an indication of the one or more capabilities to the client device; and determining one or more of the capabilities of the third-party application data are needed to perform the certain fulfillment of the assistant command.

In some implementations, the third-party application can be operating in a foreground of the client device, and determining whether the third-party application data is needed to perform the certain fulfillment of the assistant command can include determining one or more capabilities of the third-party application based on content currently displayed in the foreground of the client device by the third-party application; and determining one or more of the capabilities of the third-party application data are needed to perform the certain fulfillment of the assistant command.

In some implementations, determining whether the third-party application data is needed to perform the certain fulfillment of the assistant command can include processing, locally at the client device, the user input to determine a given category associated with the assistant command, the given category being one of a plurality of disparate categories; and determining the third-party application data is needed to perform the certain fulfillment of the assistant command based on the given category associated with the assistant command.

In some implementations, a method implemented by one or more processors is provided, and includes receiving, via one or more microphones of a client device of a user, audio data capturing a spoken utterance directed to an automated assistant; processing, using an on-device speech recognition (ASR) model stored locally on the client device, the audio data to determine an assistant command included in the spoken utterance; processing, using an on-device ambient noise model stored locally on the client device, the audio data to determine a given category associated with ambient noise captured in the audio data, the given category being one of a plurality of disparate categories; determining whether the given category associated with the ambient noise captured in the audio data corresponds to one or more particular categories; and in response to determining that the given category associated with the ambient noise captured in the audio data corresponds to one or more particular categories: generating a request to be transmitted to a server or a third-party application; receiving, via the client device of the user, the data to perform the certain fulfillment of the assistant command; and causing the client device to utilize the data to perform the certain fulfillment of the assistant command. The request to be transmitted to the server or the third-party application requests data that is needed to perform certain fulfillment of the assistant command. Further, the request includes an indication that the audio data capturing the spoken utterance that includes the assistant command cannot be stored by the server or the third-party application.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving, via a client device of a user, user input directed to an automated assistant, the user input including an assistant command;

determining, based on the assistant command, whether a third-party application or server is needed to perform a certain fulfillment of the assistant command; and in response to determining that the third-party application or server is needed to perform the certain fulfillment of the assistant command:

determining whether the user has previously consented, prior to receiving the user input, to transmitting requests associated with assistant commands to the third-party application or server, wherein, in transmitting the requests associated with the assistant commands to the third-party application or server, the automated assistant transmits user data of the user to the third-party application or server in furtherance of performing the certain fulfillment of the assistant command;

in response to determining that the user has previously consented to transmitting requests associated with assistant commands to the third-party application or server:

transmitting a third-party request to the third-party application or server to cause the certain fulfillment of the assistant command to be performed and without prompting, responsive to receiving the user input, the user to consent to transmitting the third-party request to the third-party application or server; and in response to determining that the user has not previously consented to transmitting requests associated with assistant commands to the third-party application or server:

generating a prompt that identifies the third-party application or server and that requests the user consent to transmitting the third-party request to the third-party application or server to cause the certain fulfillment of the assistant command to be performed;

causing the prompt to be provided for presentation to the user via the client device;

receiving, via the client device of the user, additional user input directed to the automated assistant, the additional user input being responsive to the prompt; and determining, based on the additional user input, whether to transmit the third-party request to the third-party server to cause the certain fulfillment of the assistant command to be performed.

2. The method of claim 1, further comprising:

subsequent to the third-party request being transmitted to the third-party application or server receiving third-party data from the third-party application or server; and causing, based on the third-party data received from the third-party application or server, responsive content to be provided for presentation to the user via the client device to cause the certain fulfillment of the assistant command to be performed.

3. The method of claim 1, further comprising:

in response to determining that the additional user input consents to transmitting a third-party request to the third-party application or server to cause the certain fulfillment of the assistant command to be performed:

transmitting the third-party request to the third-party application or server to cause the certain fulfillment of the assistant command to be performed.

4. The method of claim 1, further comprising:

in response to determining the additional user input does not consent to transmitting a third-party request to the third-party application or server to cause the certain fulfillment of the assistant command to be performed:

refraining from causing the third-party request to be transmitted to the third-party application or server to cause the certain fulfillment of the assistant command to be performed; and causing the automated assistant to attempt to perform the certain fulfillment of the assistant command.

5. The method of claim 4, wherein causing the automated assistant to attempt to perform the certain fulfillment of the assistant command comprises:

causing the automated assistant to determine whether the certain fulfillment of the assistant command can be performed without third-party data from the third-party application or server; and in response to the automated assistant determining that the certain fulfillment of the assistant command cannot be performed without third-party data from the third-party application or server:

generating a notification that indicates the certain fulfillment of the assistant command cannot be performed without the third-party data from the third-party application or server; and causing the notification to be provided for presentation to the user via the client device.

6. The method of claim 1, wherein causing the prompt to be provided for presentation to the user via the client device comprises:

causing synthesized speech audio data that includes the prompt to be audibly rendered for presentation to the user via one or more speakers of the client device; and/or causing the prompt and one or more corresponding selectable elements to be visually rendered for presentation to the user via a display of the client device.

7. The method of claim 1, wherein determining that the third-party application or server is needed to perform the certain fulfillment of the assistant command comprises:

determining one or more capabilities of the third-party application or server based on the third-party application or server providing an indication of the one or more capabilities to the client device or the automated assistant; and determining one or more of the capabilities of the third-party application or server are needed to perform the certain fulfillment of the assistant command.

8. The method of claim 1, wherein determining that the third-party application or server is needed to perform the certain fulfillment of the assistant command comprises:

determining one or more capabilities of the third-party application or server based on content currently displayed in the foreground of the client device; and determining one or more of the capabilities of the third-party application or server are needed to perform the certain fulfillment of the assistant command.

9. The method of claim 1, wherein determining that the user has previously consented to transmitting requests associated with assistant commands to the third-party application or server comprises:

prior to receiving the user input:

determining that the user consented, in a settings menu, to transmitting requests associated with assistant commands to the third-party application or server; or determining that the user consented, in a prior interaction with the automated assistant, to transmitting requests associated with assistant commands to the third-party application or server.

10. A system comprising:

at least one processor; and memory storing instructions that, when executed, cause the at least one processor to be operable to:

receive, via a client device of a user, user input directed to an automated assistant, the user input including an assistant command;

determine, based on the assistant command, whether a third-party application or server is needed to perform a certain fulfillment of the assistant command; and in response to determining that the third-party application or server is needed to perform the certain fulfillment of the assistant command:

determine whether the user has previously consented, prior to receiving the user input, to transmitting requests associated with assistant commands to the third-party application or server, wherein, in transmitting the requests associated with the assistant commands to the third-party application or server, the automated assistant transmits user data of the user to the third-party application or server in furtherance of performing the certain fulfillment of the assistant command;

in response to determining that the user has previously consented to transmitting requests associated with assistant commands to the third-party application or server:

transmit a third-party request to the third-party application or server to cause the certain fulfillment of the assistant command to be performed and without prompting, responsive to receiving the user input, the user to consent to transmitting the third-party request to the third-party application or server; and in response to determining that the user has not previously consented to transmitting requests associated with assistant commands to the third-party application or server:

generate a prompt that identifies the third-party application or server and that requests the user consent to transmitting the third-party request to the third-party application or server to cause the certain fulfillment of the assistant command to be performed;

cause the prompt to be provided for presentation to the user via the client device;

receive, via the client device of the user, additional user input directed to the automated assistant, the additional user input being responsive to the prompt; and determine, based on the additional user input, whether to transmit the third-party request to the third-party server to cause the certain fulfillment of the assistant command to be performed.

11. The system of claim 10, wherein the instructions further cause the at least one processor to be operable to:

subsequent to the third-party request being transmitted to the third-party application or server receive third-party data from the third-party application or server; and cause, based on the third-party data received from the third-party application or server, responsive content to be provided for presentation to the user via the client device to cause the certain fulfillment of the assistant command to be performed.

12. The system of claim 10, wherein the instructions further cause the at least one processor to be operable to:

in response to determining that the additional user input consents to transmitting a third-party request to the third-party application or server to cause the certain fulfillment of the assistant command to be performed:

transmit the third-party request to the third-party application or server to cause the certain fulfillment of the assistant command to be performed.

13. The system of claim 10, wherein the instructions further cause the at least one processor to be operable to:

in response to determining the additional user input does not consent to transmitting a third-party request to the third-party application or server to cause the certain fulfillment of the assistant command to be performed:

refrain from causing the third-party request to be transmitted to the third-party application or server to cause the certain fulfillment of the assistant command to be performed; and cause the automated assistant to attempt to perform the certain fulfillment of the assistant command.

14. The system of claim 13, wherein the instructions to cause the automated assistant to attempt to perform the certain fulfillment of the assistant command comprise instructions to:

cause the automated assistant to determine whether the certain fulfillment of the assistant command can be performed without third-party data from the third-party application or server; and in response to the automated assistant determining that the certain fulfillment of the assistant command cannot be performed without third-party data from the third-party application or server:

generate a notification that indicates the certain fulfillment of the assistant command cannot be performed without the third-party data from the third-party application or server; and cause the notification to be provided for presentation to the user via the client device.

15. The system of claim 10, wherein the instructions to cause the prompt to be provided for presentation to the user via the client device comprise instructions to:

cause synthesized speech audio data that includes the prompt to be audibly rendered for presentation to the user via one or more speakers of the client device; and/or cause the prompt and one or more corresponding selectable elements to be visually rendered for presentation to the user via a display of the client device.

16. The system of claim 10, wherein the instructions to determine that the third-party application or server is needed to perform the certain fulfillment of the assistant command comprise instructions to:

determine one or more capabilities of the third-party application or server based on the third-party application or server providing an indication of the one or more capabilities to the client device or the automated assistant; and determine one or more of the capabilities of the third-party application or server are needed to perform the certain fulfillment of the assistant command.

17. The system of claim 10, wherein the instructions to determine that the third-party application or server is needed to perform the certain fulfillment of the assistant command comprise instructions to:

determine one or more capabilities of the third-party application or server based on content currently displayed in the foreground of the client device; and determine one or more of the capabilities of the third-party application or server are needed to perform the certain fulfillment of the assistant command.

18. The system of claim 10, wherein the instructions to determine that the user has previously consented to transmitting requests associated with assistant commands to the third-party application or server comprise instructions to:

prior to receiving the user input:

determine that the user consented, in a settings menu, to transmitting requests associated with assistant commands to the third-party application or server; or determine that the user consented, in a prior interaction with the automated assistant, to transmitting requests associated with assistant commands to the third-party application or server.

19. A non-transitory computer-readable storage medium storing instructions that, when executed by at least one processor, cause the at least one processor to execute the instructions to:

receive, via a client device of a user, user input directed to an automated assistant, the user input including an assistant command;

determine, based on the assistant command, whether a third-party application or server is needed to perform a certain fulfillment of the assistant command; and in response to determining that the third-party application or server is needed to perform the certain fulfillment of the assistant command:

determine whether the user has previously consented, prior to receiving the user input, to transmitting requests associated with assistant commands to the third-party application or server, wherein, in transmitting the requests associated with the assistant commands to the third-party application or server, the automated assistant transmits user data of the user to the third-party application or server in furtherance of performing the certain fulfillment of the assistant command;

in response to determining that the user has previously consented to transmitting requests associated with assistant commands to the third-party application or server:

transmit a third-party request to the third-party application or server to cause the certain fulfillment of the assistant command to be performed and without prompting, responsive to receiving the user input, the user to consent to transmitting the third-party request to the third-party application or server; and in response to determining that the user has not previously consented to transmitting requests associated with assistant commands to the third-party application or server:

generate a prompt that identifies the third-party application or server and that requests the user consent to transmitting the third-party request to the third-party application or server to cause the certain fulfillment of the assistant command to be performed;

cause the prompt to be provided for presentation to the user via the client device;

receive, via the client device of the user, additional user input directed to the automated assistant, the additional user input being responsive to the prompt; and determine, based on the additional user input, whether to transmit the third-party request to the third-party server to cause the certain fulfillment of the assistant command to be performed.

20. The non-transitory computer-readable storage medium of claim 19, the instructions further to:

subsequent to the third-party request being transmitted to the third-party application or server receive third-party data from the third-party application or server; and cause, based on the third-party data received from the third-party application or server, responsive content to be provided for presentation to the user via the client device to cause the certain fulfillment of the assistant command to be performed.

* * * * *